United States Patent [19]

John et al.

[11] 4,364,308
[45] Dec. 21, 1982

[54] APPARATUS FOR PREPARING FOOD

[75] Inventors: Raymond John, Carpentersville; Jerome G. Apfelbaum, Arlington Heights; Robert L. Moore, LaGrange, all of Ill.

[73] Assignees: Engineering Inventions, Inc.; Multisensors Inc., ; a part interest

[21] Appl. No.: 188,318

[22] Filed: Sep. 18, 1980

Related U.S. Application Data

[60] Division of Ser. No. 693,548, Jun. 7, 1976, Pat. No. 4,241,650, which is a continuation of Ser. No. 460,798, Apr. 15, 1979, abandoned, which is a continuation-in-part of Ser. No. 292,479, Sep. 27, 1972, abandoned.

[51] Int. Cl.[3] .......................................... A47J 37/06
[52] U.S. Cl. ...................................... 99/351; 99/369; 99/372; 99/378; 99/380
[58] Field of Search ................. 99/372, 340, 349, 375, 99/379, 385, 391, 359, 369, 351, 374, 378, 380; 219/387, 525

[56] References Cited

U.S. PATENT DOCUMENTS

| | | | |
|---|---|---|---|
| 1,839,112 | 12/1931 | Mills | 99/375 |
| 1,859,004 | 5/1932 | Reich | 99/379 |
| 1,874,836 | 8/1932 | Trenner et al. | 99/375 |
| 1,929,166 | 10/1933 | Freemon | 99/375 X |
| 1,960,964 | 5/1934 | Wilde | 99/351 |
| 2,027,002 | 1/1936 | Spang | 99/351 X |
| 2,033,060 | 3/1936 | Anderson | 99/379 |
| 2,078,189 | 4/1937 | Bemis | 99/375 |
| 2,632,379 | 3/1953 | Kudo | 99/375 |
| 2,644,880 | 7/1953 | Valentini et al. | 219/525 |
| 2,718,842 | 9/1955 | Klemm | 99/351 |
| 2,779,850 | 1/1957 | Gomersall | 99/385 UX |
| 2,865,280 | 12/1958 | Lamatina | 99/374 |
| 3,010,383 | 11/1961 | Greene | 99/349 X |
| 3,313,230 | 4/1967 | Simjian | 99/375 |
| 3,678,248 | 7/1972 | Tricault et al. | 219/425 |
| 3,719,507 | 3/1973 | Bardeau | 99/375 |
| 3,725,645 | 4/1973 | Shevlin | 219/387 X |
| 3,736,981 | 6/1973 | Shevlin | 219/387 X |
| 3,746,837 | 7/1973 | Frey et al. | 219/387 |

FOREIGN PATENT DOCUMENTS 314741 7/1929 United Kingdom ............... 99/351

*Primary Examiner*—Billy J. Wilhite
*Attorney, Agent, or Firm*—McDougall, Hersh & Scott

[57] ABSTRACT

An apparatus for cooking or otherwise heating food held in a container which includes upper and lower housing portions. Heating elements are located in the respective housing portions, and the opposed inner walls of the housing portions are adapted to be moved into contact with the food container. The heating elements are positioned immediately adjacent these walls, and these elements are substantially insulated from other portions of the housing. The intimate contact between the inner walls and the associated heating elements causes the food to act as a heat sink whereby the food is rapidly heated in a highly effective manner. The apparatus is particularly useful for the cooking of frozen food located in an appropriate container. Means are provided for retaining the upper housing in spaced apart relationship with the lower housing to permit baking and similar heating.

16 Claims, 52 Drawing Figures

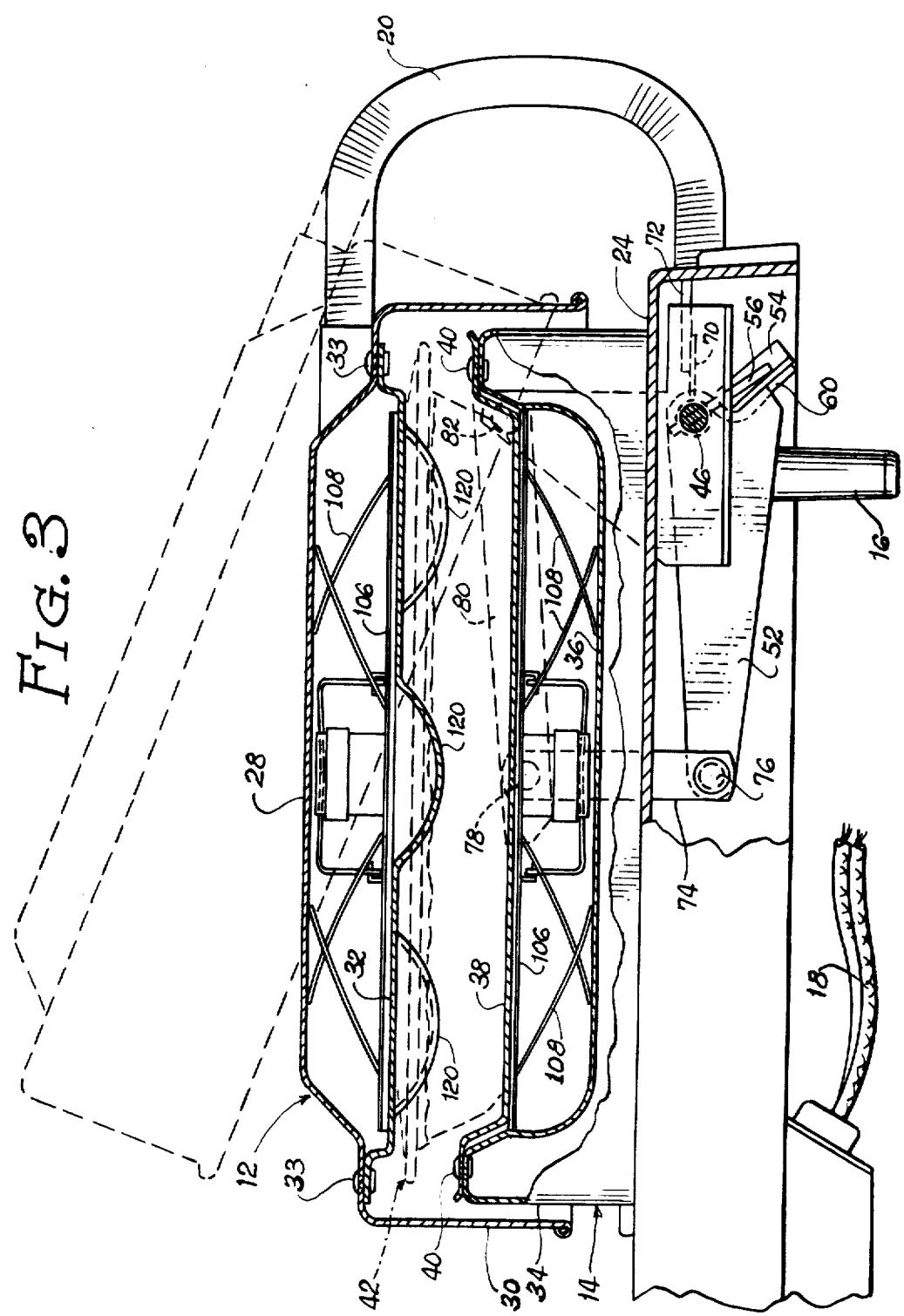

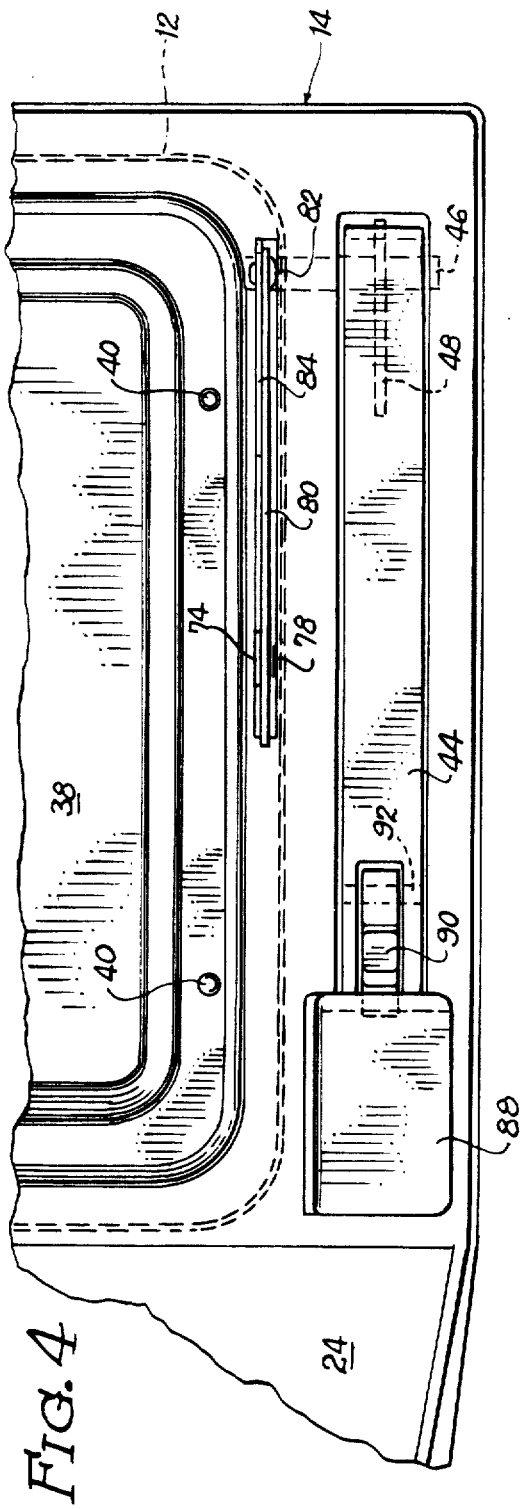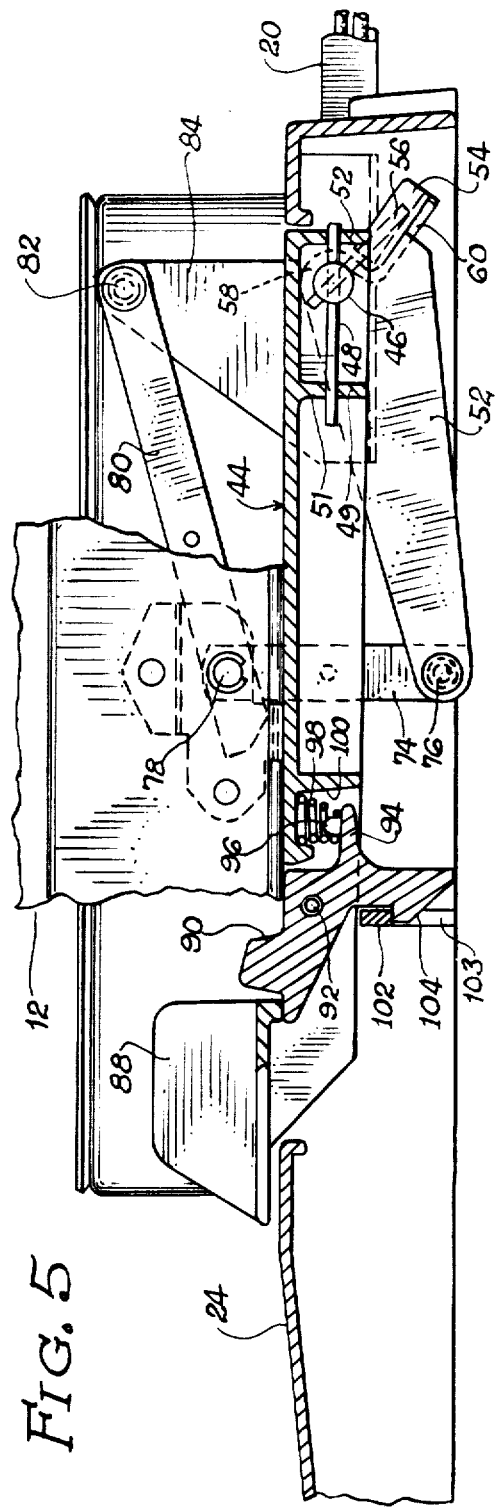

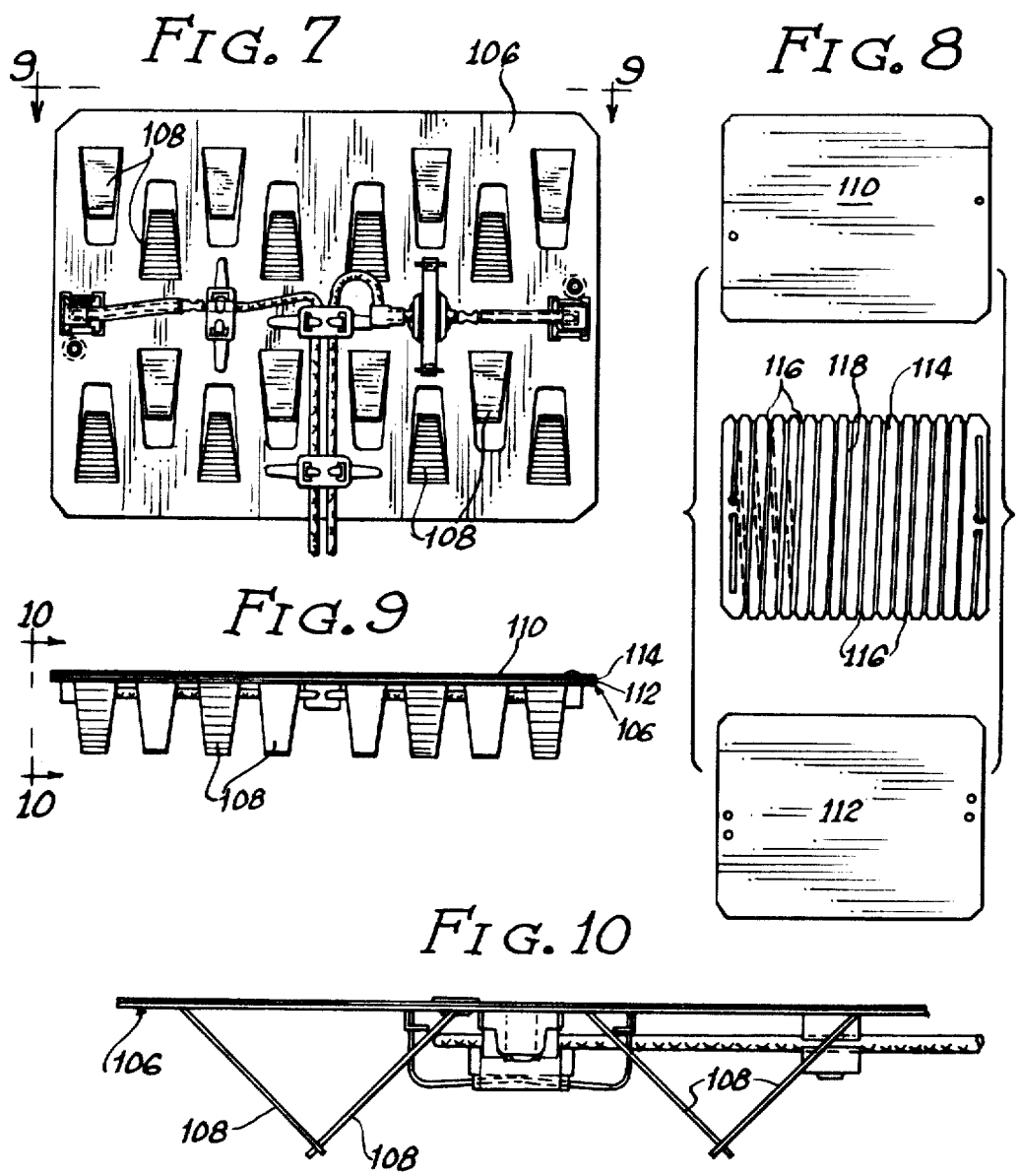

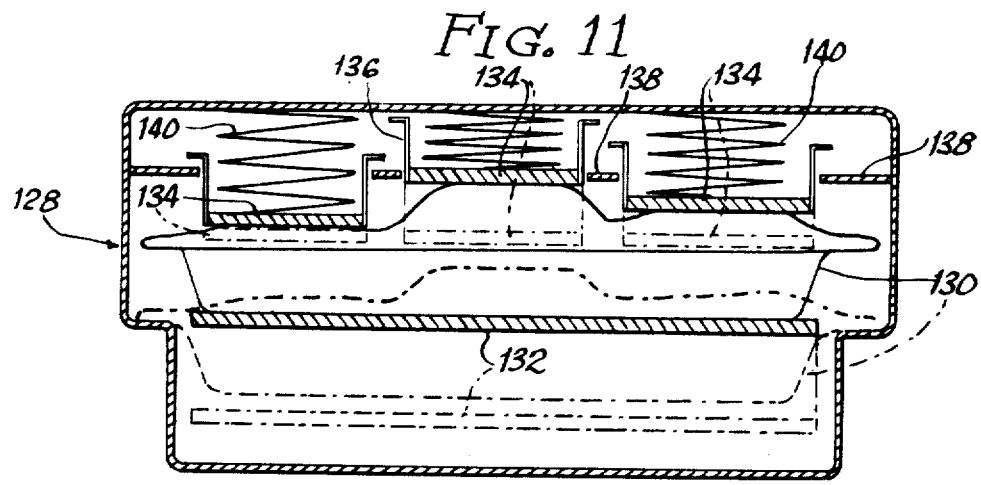
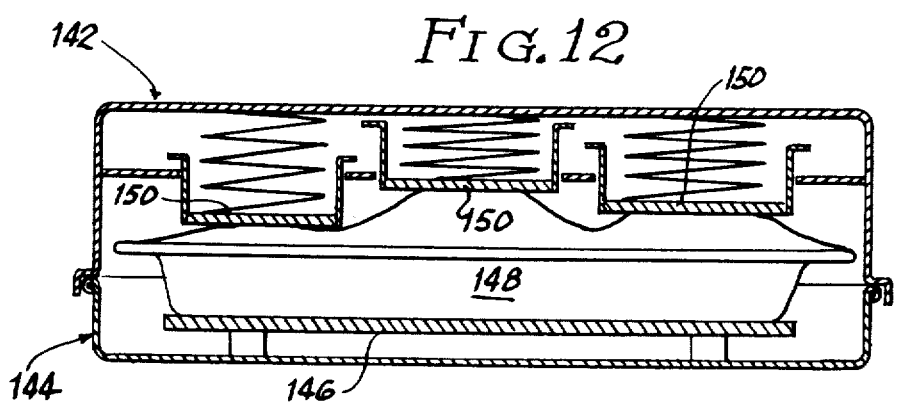
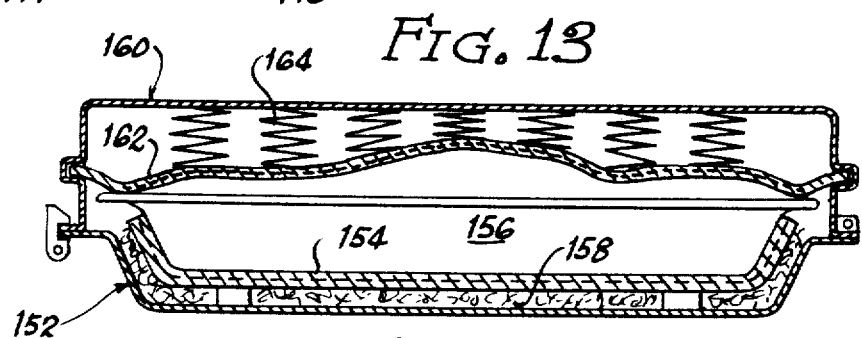
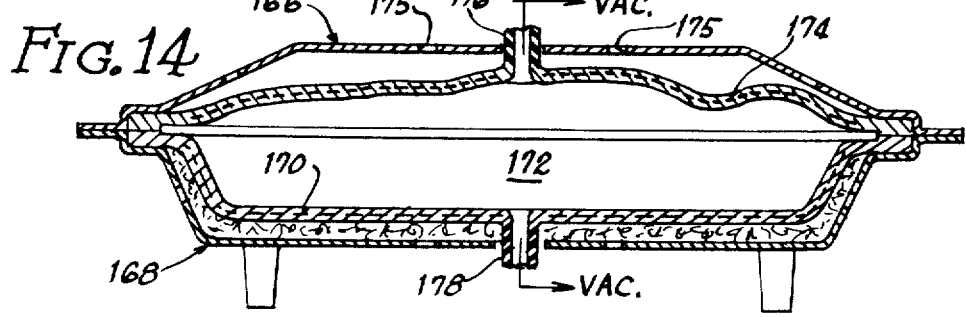

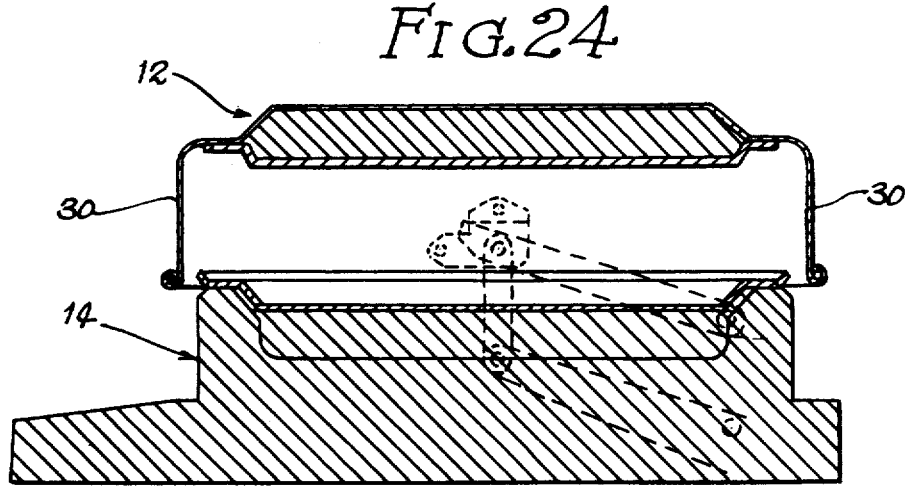
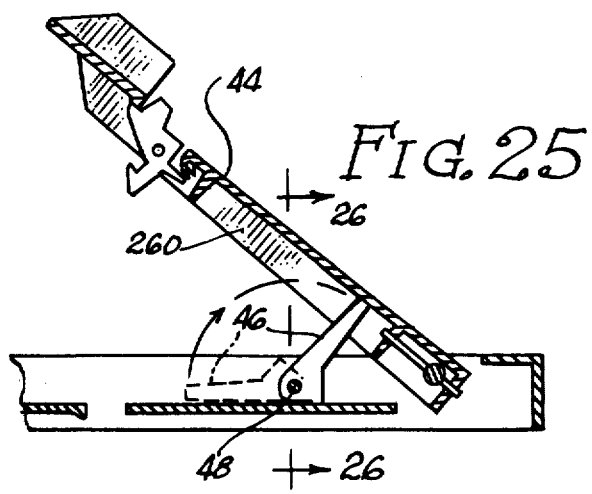
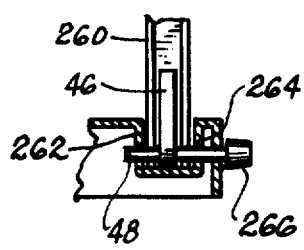
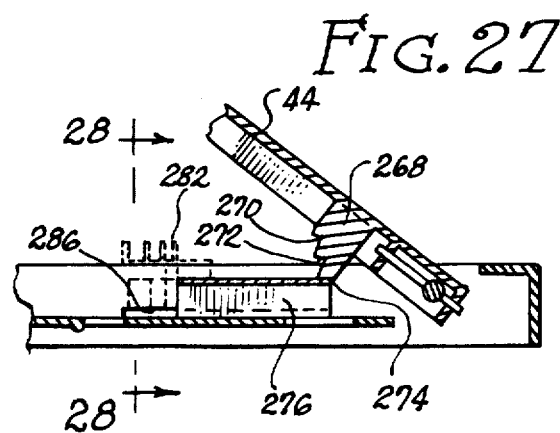
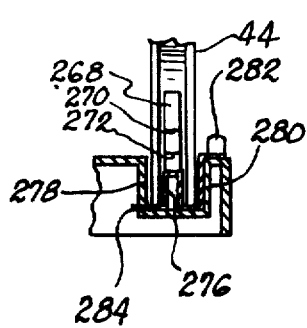

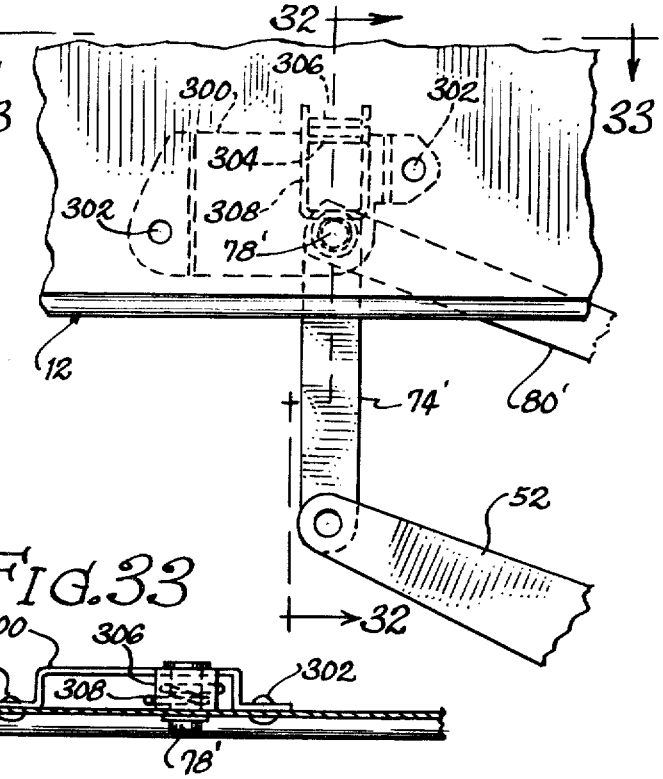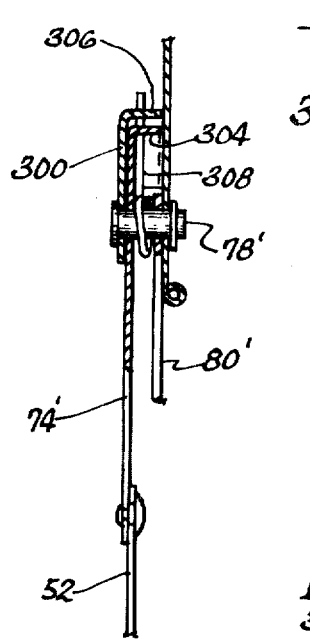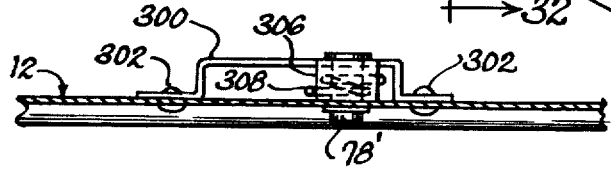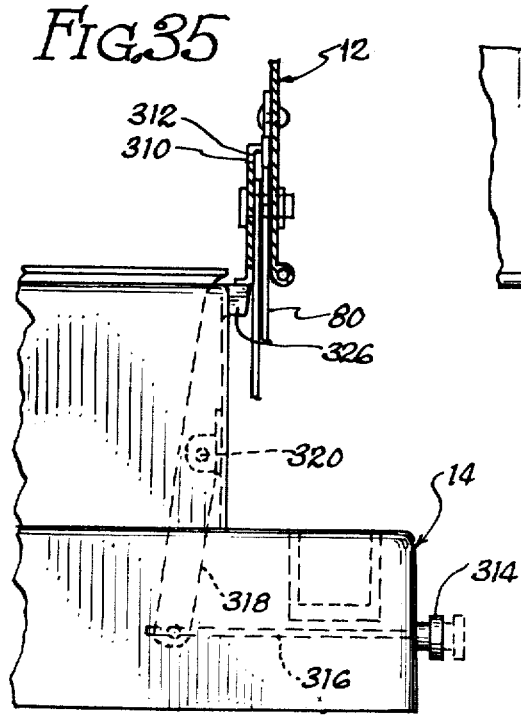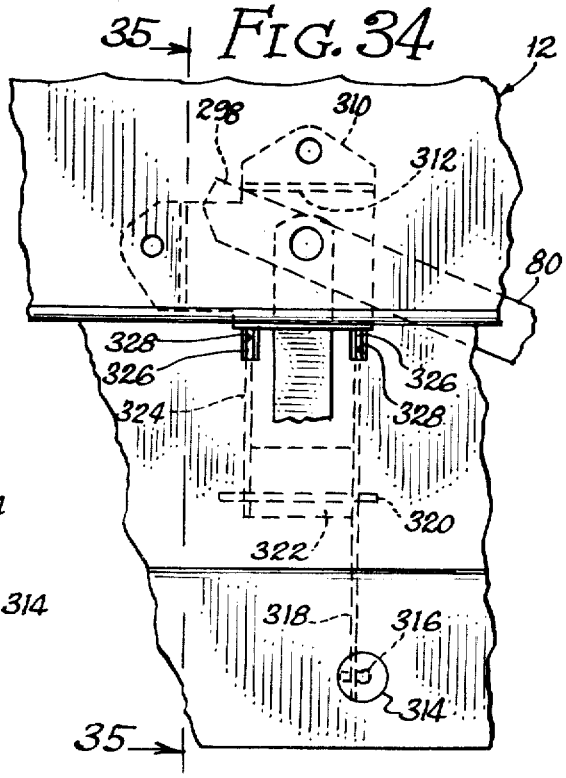

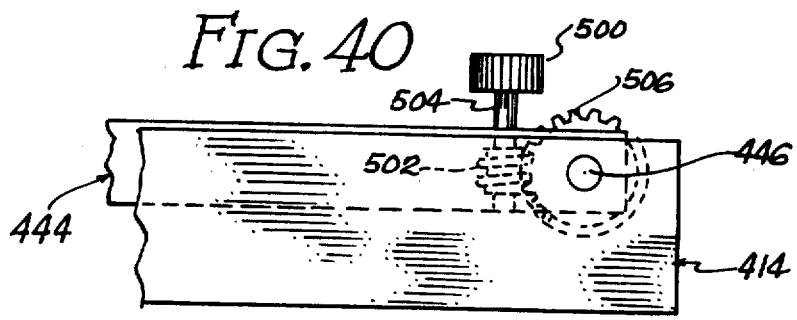
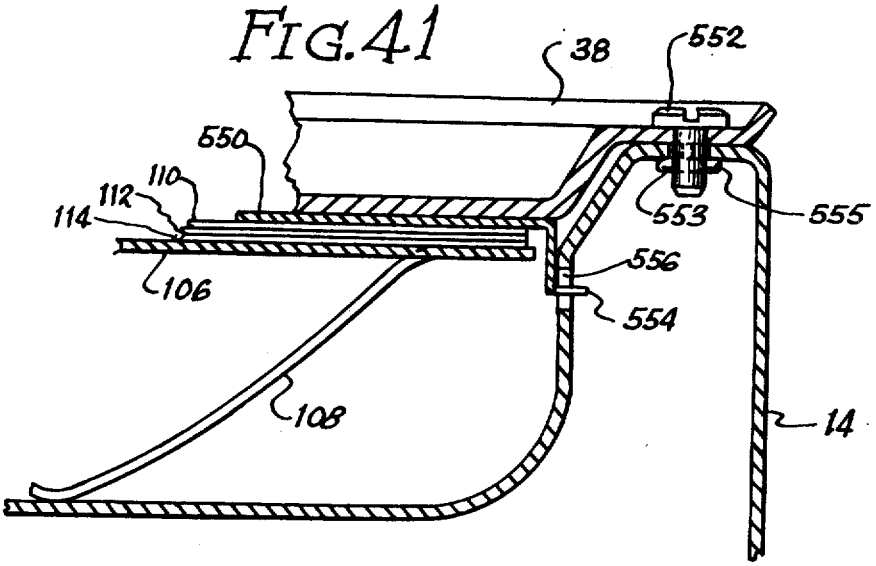
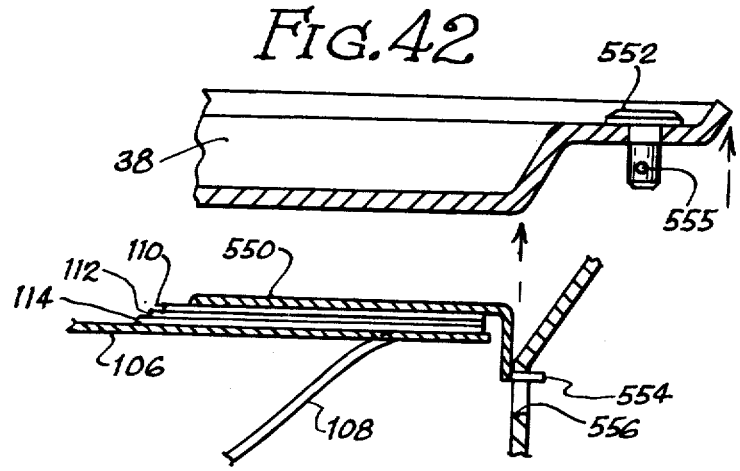

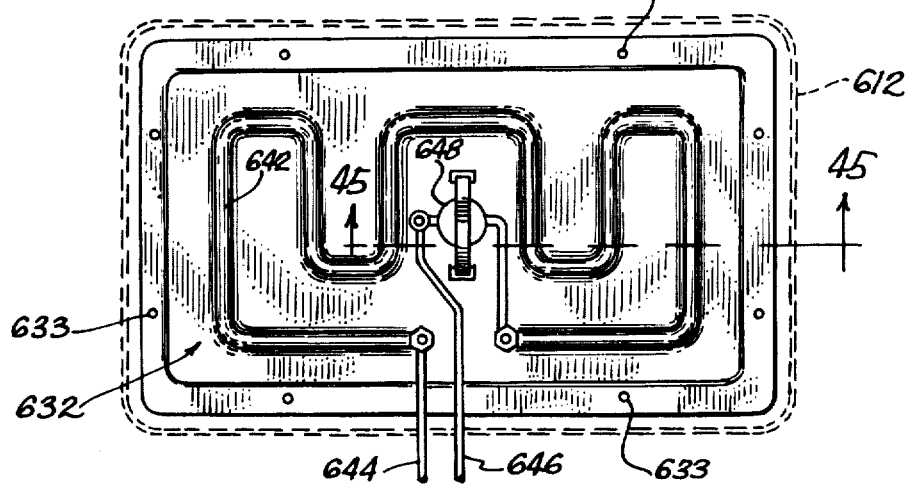
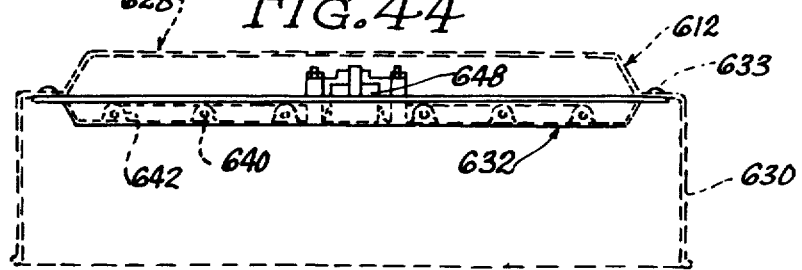
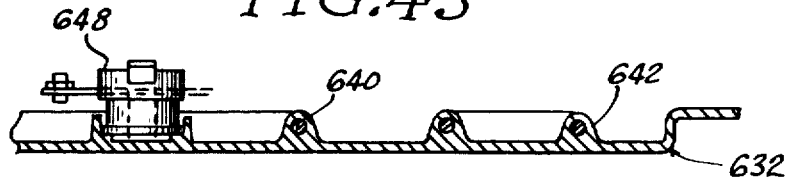
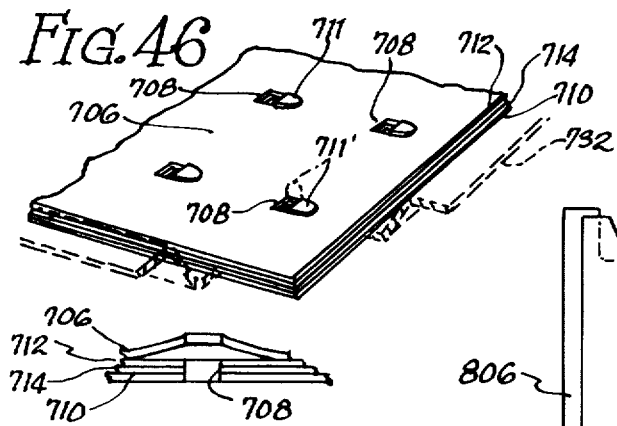
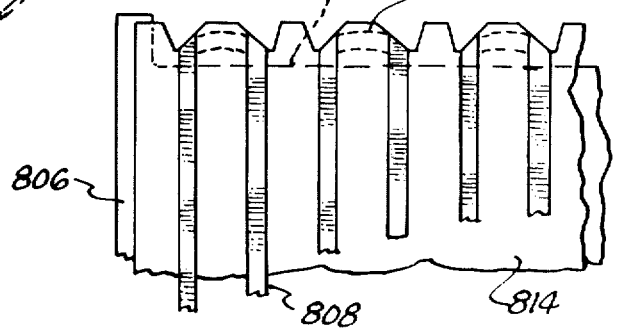

APPARATUS FOR PREPARING FOOD

This is a divisional application based on application Ser. No. 693,548 filed on June 7, 1976, now U.S. Pat. No. 4,241,650, which is a continuation of application Ser. No. 460,798, filed on Apr. 15, 1974, now abandoned, which is a continuation-in-part of application Ser. No. 292,479, filed on Sept. 27, 1972, now abandoned. Application Ser. No. 687,099, filed on May 17, 1976, now U.S. Pat. No. 4,102,256, is a continuation of the aforesaid application Ser. No. 292,479.

This invention relates to a cooking or heating apparatus for use in conjunction with food, including food which is held in a container. Frozen "TV" dinners are typical examples of products adapted to be cooked with the apparatus of the invention. Certain aspects of the invention will be described with respect to the cooking of food of this type; however, it will be understood that other containerized food products are suitable for use in conjunction with the apparatus of this invention including food which is hand-wrapped for use in the apparatus. In addition, the application of these aspects as well as other features of the invention to other food products will also be apparent.

Frozen dinners are becoming increasingly popular due to the obvious convenient features thereof. It is recognized, however, that the dinners are often somewhat less than appetizing, and they suffer from the additional disadvantage of requiring substantial time for cooking. A typical dinner package recommends a heating time of 35 minutes which detracts from the convenience aspects thereof.

Other food heating operations, including the heating of both food in or out of containers, can be significantly improved by more rapid and efficient heating provided that the apparatus employed is not unduly expensive, particularly for consumer use.

It is a general object of this invention to provide an improved apparatus for cooking and heating food such as frozen dinners, other containerized food, and food without any container.

It is a more specific object of this invention to provide an apparatus which is capable of cooking or otherwise heating frozen dinners and other food very rapidly while providing maximum appetizing characteristics for the food product.

It is a further object of this invention to provide a structure with means for baking food products and for similar heating purposes.

It is a still further object of this invention to provide a cooking apparatus which includes improved structural characteristics whereby the operation of the apparatus can be carried out in a highly efficient manner.

It is a still further object of this invention to provide a cooking and heating apparatus which includes highly efficient heating mechanisms whereby rapid heating of food products can be accomplished with a minimum of energy dissipation.

These and other objects of this invention will appear hereinafter and for purposes of illustration, but not of limitation, specific embodiments of the invention are shown in the accompanying drawings in which:

FIG. 3 is an enlarged fragmentary side elevation of the apparatus, partly cut away;

FIG. 4 is an enlarged fragmentary view illustrating the operating handle associated with the construction;

FIG. 5 is a fragmentary side elevational view, partly cut away, illustrating further details of the handle construction and associated linkage;

FIG. 7 is a detailed view of a heating element support means utilized in the construction;

FIG. 8 illustrates in plan view the layers utilized in the heating element of the construction;

FIG. 9 is a side elevation taken about the line 9—9 of FIG. 7 illustrating the heating element assembly and the associated support;

FIG. 10 is an enlarged side elevation of the heating element assembly taken about the line 10—10 of FIG. 9;

Figure 17:
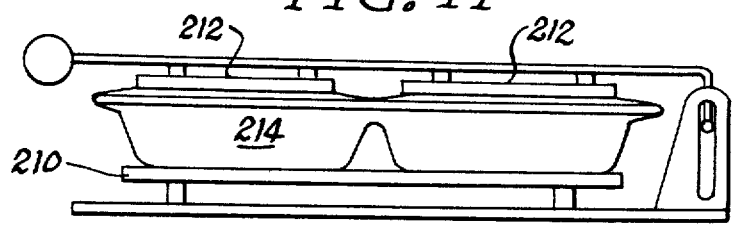
Figure 18:
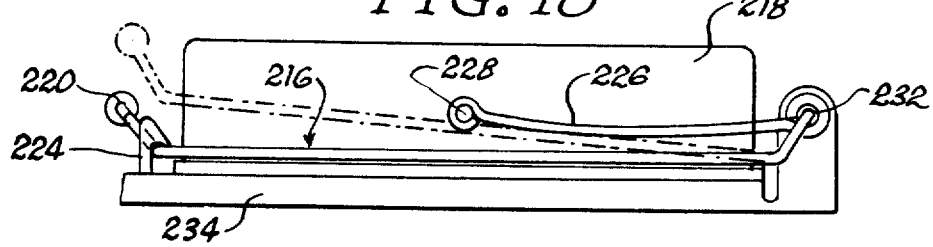
Figure 19:
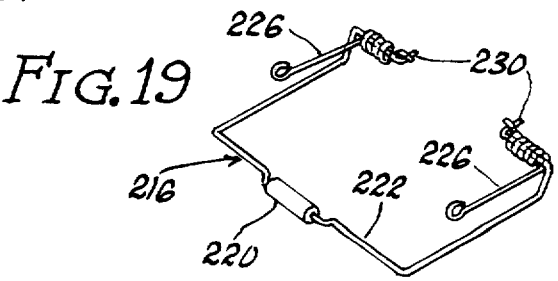
Figure 20:
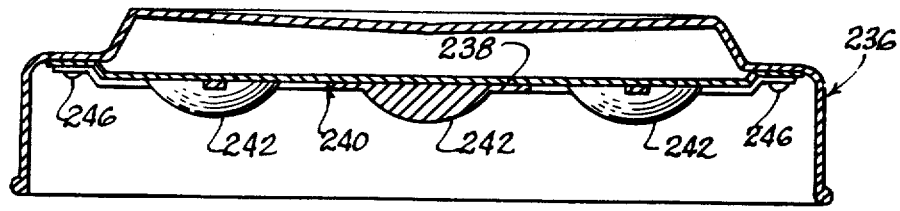
Figure 21:
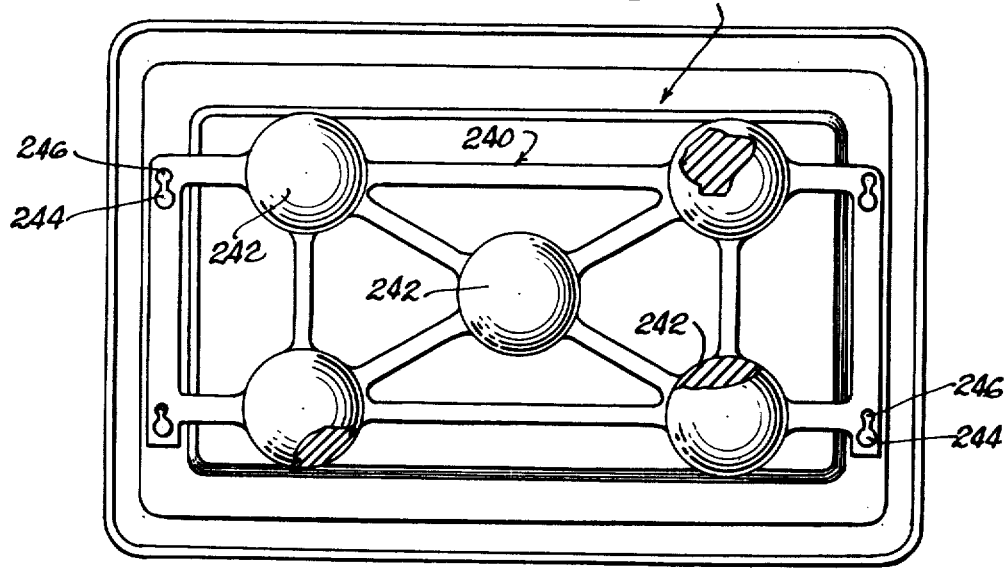
Figure 22:
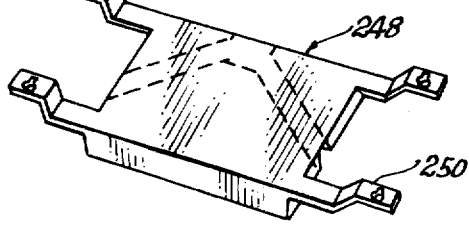
Figure 23:
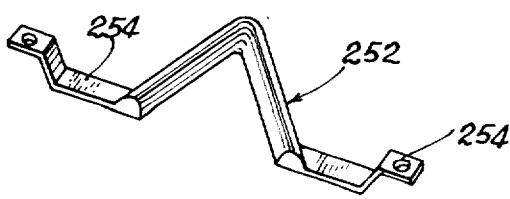
Figure 29:
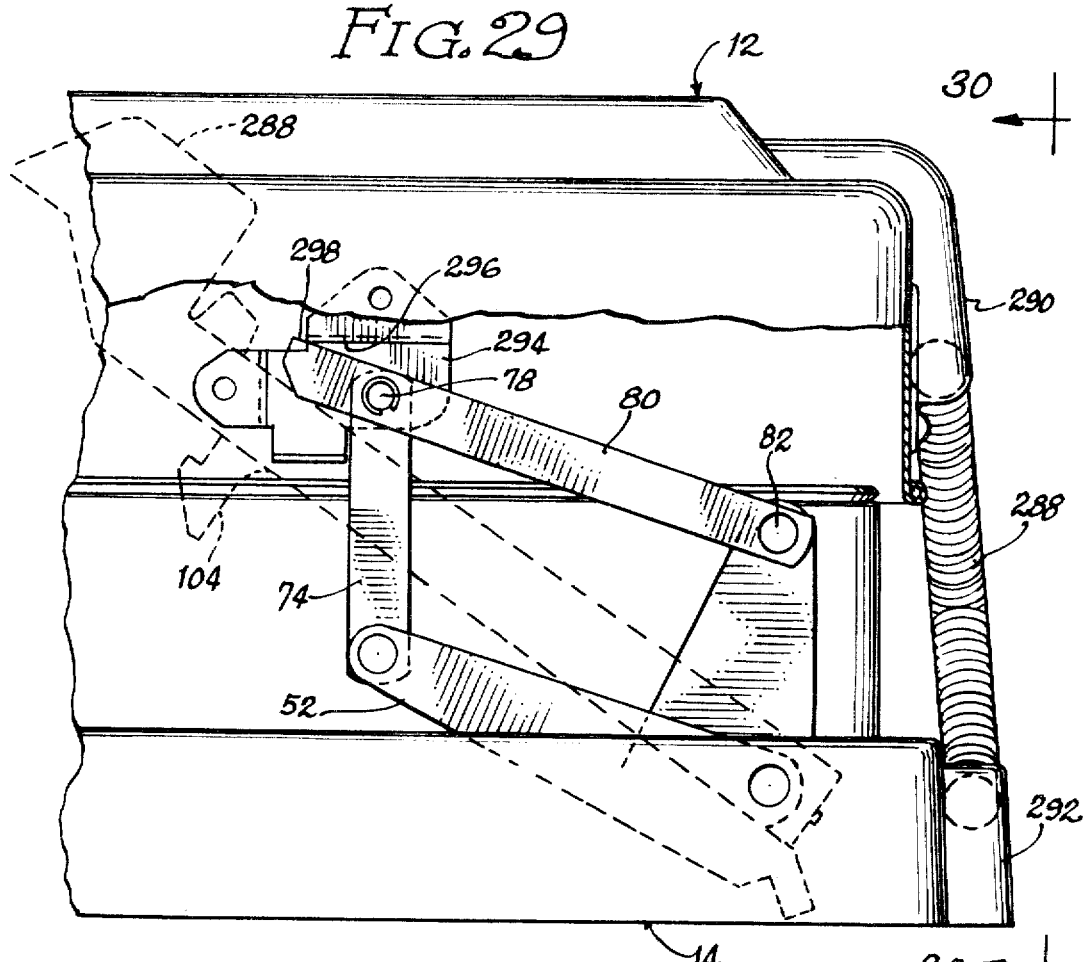
Figure 30:
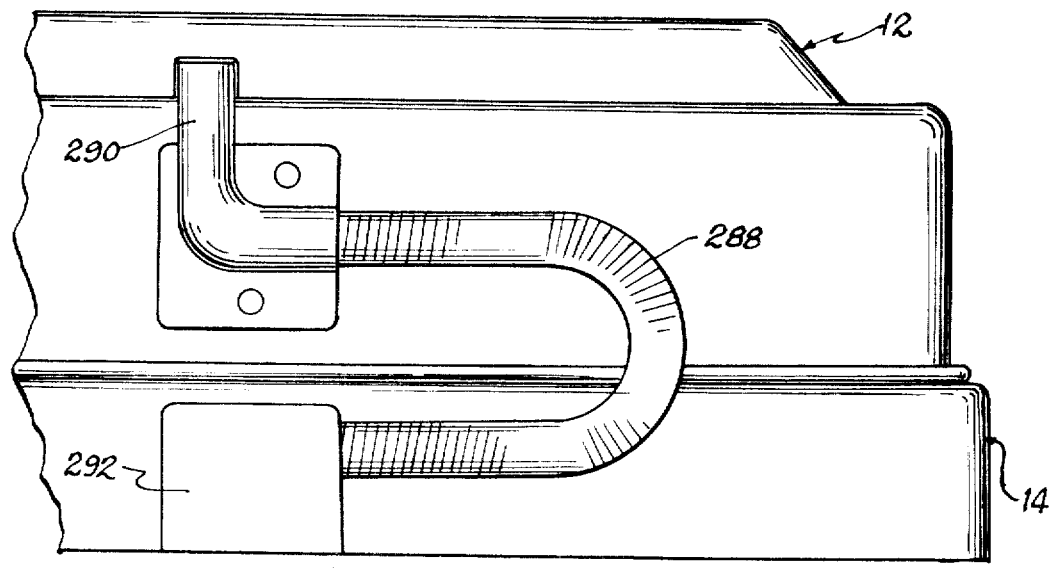
Figure 36:
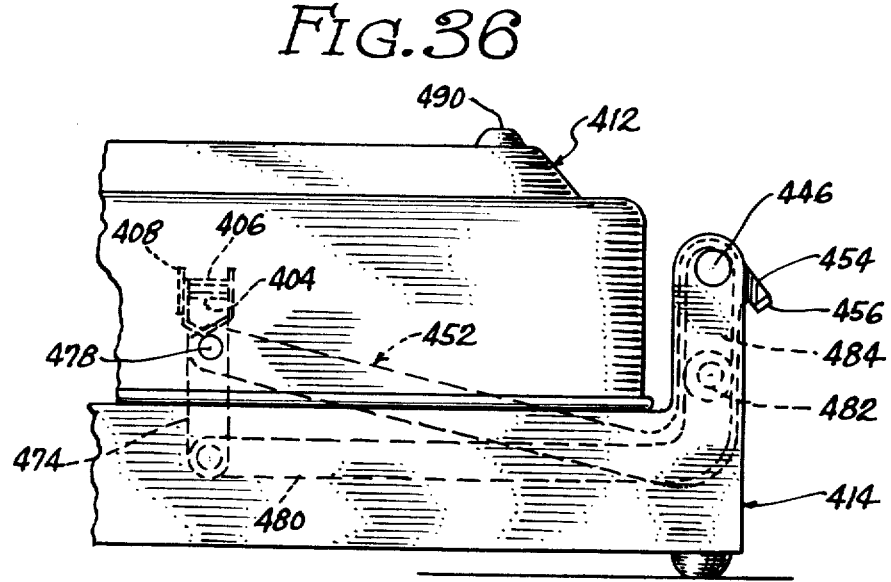
Figure 37:
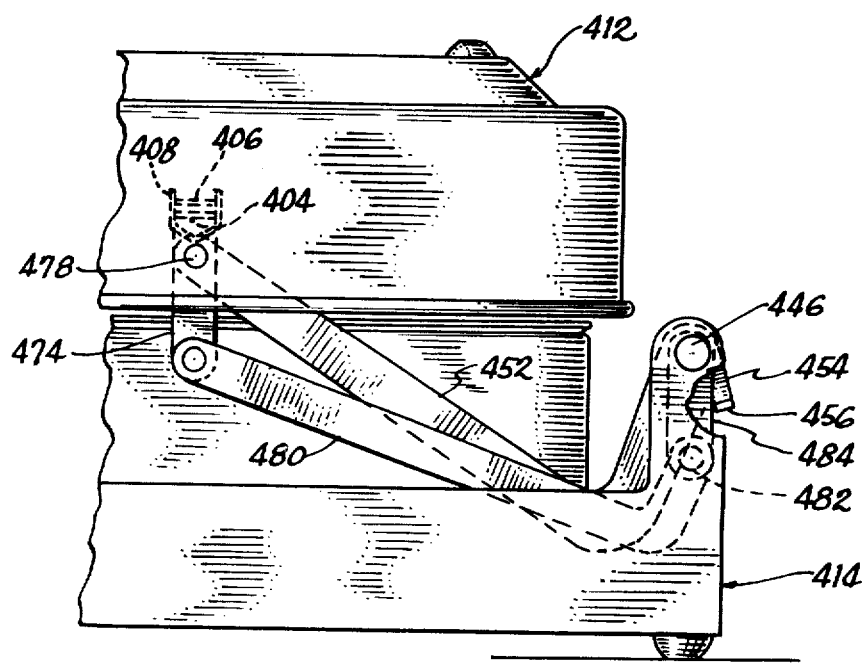
Figure 38:
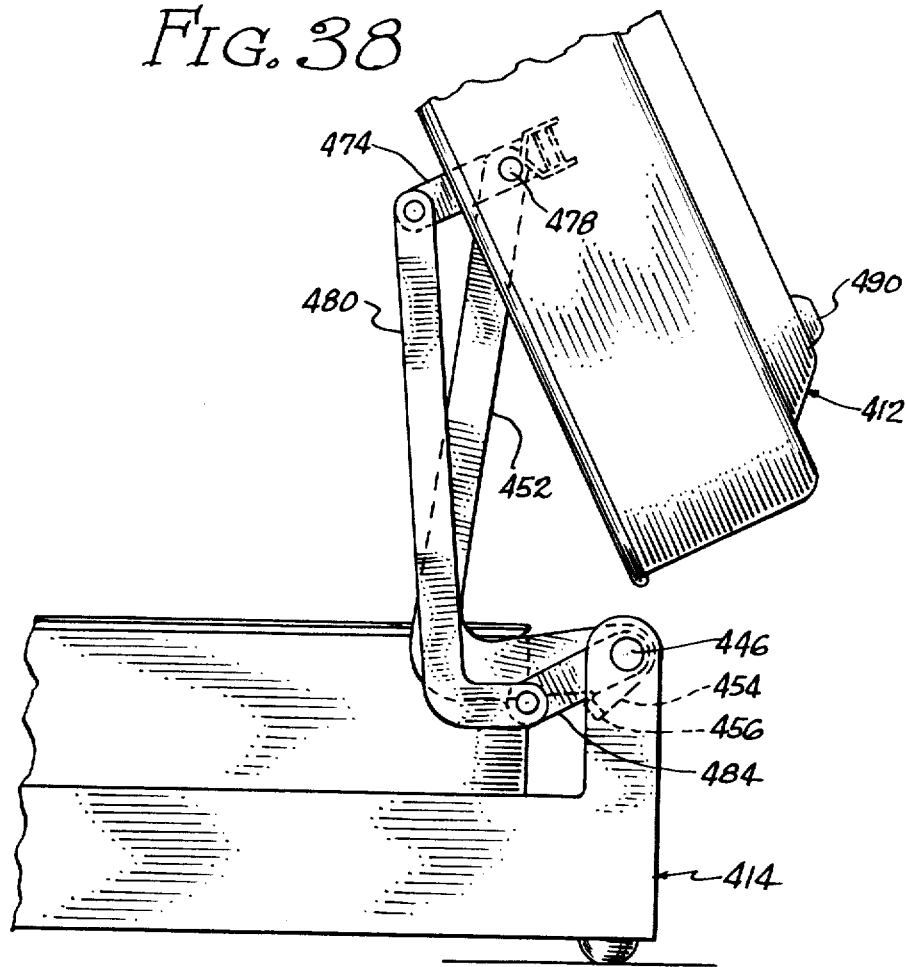
Figure 39:
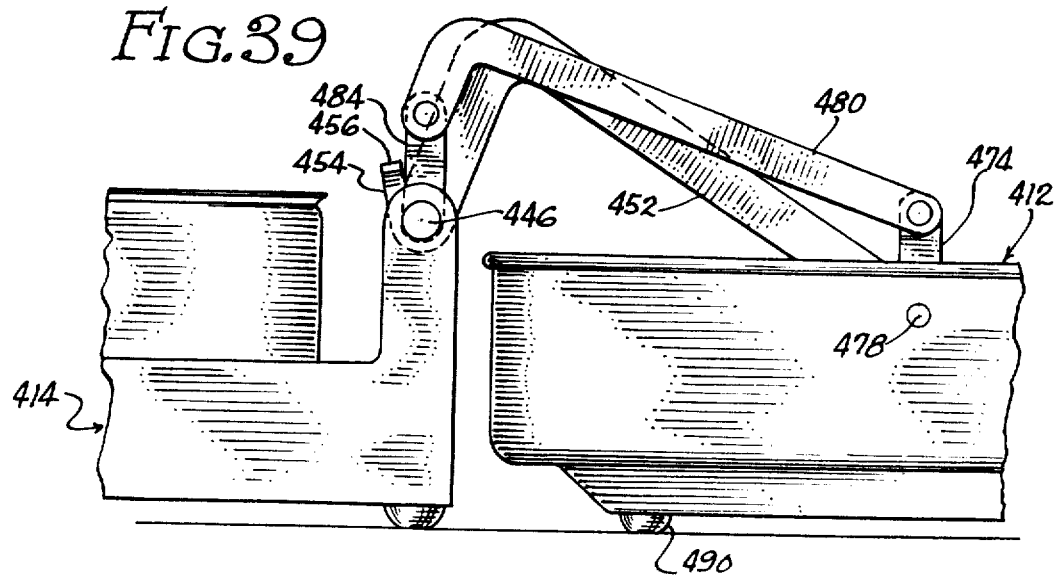
Figure 48:
Figure 49:
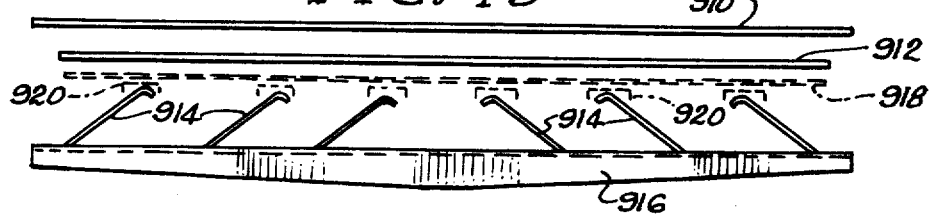
Figure 50:
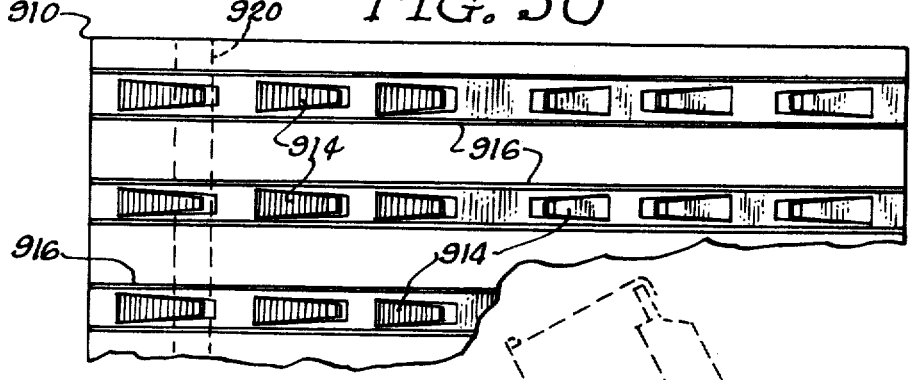
Figure 51:
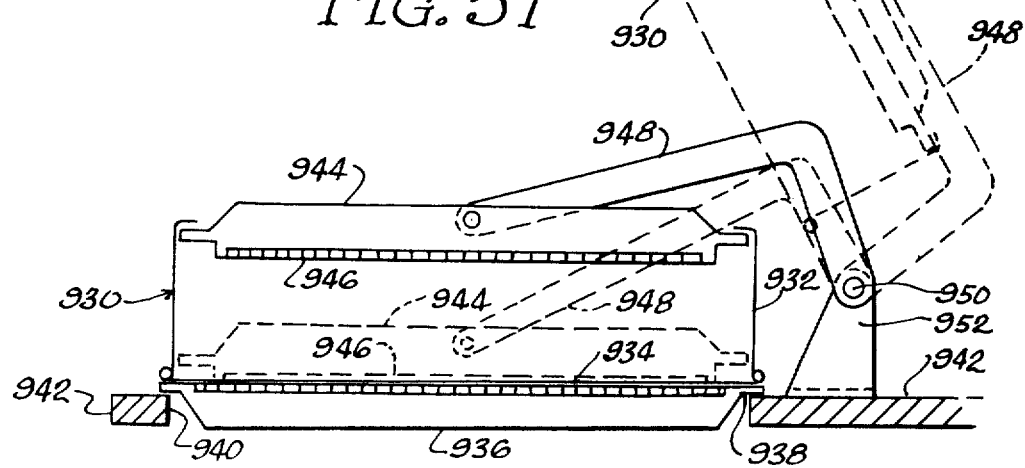

FIGS. 11 through 16 comprise cross-sectional views of respective alternative forms of the invention;

FIG. 17 is an elevational view of an additional alternative form of the invention;

FIG. 18 is an elevational view of a still further alternative form of the invention;

FIG. 19 is a perspective view of a spring loaded hinge mechanism incorporated in the structure shown in FIG. 18;

FIG. 20 is a cross-sectional view of an upper housing for a cooking apparatus including a modified heat transmitting arrangement;

FIG. 21 is a bottom plan view of the upper housing shown in FIG. 20;

FIG. 22 is a perspective view illustrating a removable heat conductor adapted to be associated with a housing;

FIG. 23 is a perspective view of another form of removable heat conductor adapted to be associated with a housing;

FIG. 24 is a cross-sectional view illustrating the apparatus in a partially raised cooking position;

FIG. 25 is an enlarged fragmentary view of a position control means for the apparatus;

FIG. 26 is a fragmentary cross-sectional view taken about the line 26—26 of FIG. 25;

FIG. 27 is an enlarged fragmentary cross-sectional view illustrating an alternative form of position control means;

FIG. 28 is a fragmentary cross-sectional view taken about the line 28—28 of FIG. 27;

FIG. 29 is a fragmentary view illustrating an alternative design for the apparatus;

FIG. 30 is a fragmentary rear view taken about the line 30—30 of FIG. 29;

FIG. 31 is a fragmentary elevational view illustrating an alternative form of linkage utilized in the construction;

FIG. 32 is a vertical sectional view taken about the line 32—32 of FIG. 31;

FIG. 33 is a fragmentary horizontal sectional view taken about the line 33—33 of FIG. 31;

FIG. 34 is a fragmentary elevational view illustrating an alternative form of position control means;

FIG. 35 is a fragmentary vertical cross-sectional view taken about the line 35—35 of FIG. 34;

FIG. 36 is a fragmentary elevational view illustrating a modified form of linkage mechanism;

FIG. 37 is a fragmentary elevational view of the linkage mechanism with the upper housing in a raised position;

FIG. 38 is a fragmentary elevational view of the linkage mechanism with the upper housing in a loading position;

FIG. 39 is a fragmentary elevational view with the upper housing in position to provide a second heating platen;

FIG. 40 is a fragmentary elevational view illustrating a pressure adjusting feature;

FIG. 41 is a fragmentary elevational view illustrating an alternative means for securing the housing inner walls to facilitate cleaning;

FIG. 42 comprises a fragmentary detail view of the inner wall and associated heating assembly;

FIG. 43 is a plan view of a modified form of heating means suitable for the apparatus;

FIG. 44 is a side elevation of an upper housing utilizing the modified heating means;

FIG. 45 is an enlarged fragmentary cross-sectional view of the heating means;

FIG. 46 is a fragmentary perspective view illustrating an alternative heating element design;

FIG. 46a is a fragmentary detail view of the heating element shown in FIG. 46;

FIG. 47 is a fragmentary detail view of an alternative heating element structure;

FIG. 48 is a diagrammatic illustration of a modified heating element arrangement;

FIG. 49 is a diagrammatic illustration of a further alternative arrangement for a heating element;

FIG. 50 is a plan view of the structure shown in FIG. 49; and,

FIG. 51 is a diagrammatic cross-sectional view of a still further modification of the invention;

This invention generally relates to a heating and cooking apparatus utilized for food in or out of a container construction. The apparatus includes a support for the food or container, and heating means are associated with the support. The heating means are held adjacent inner walls of the support whereby the heating means are closely associated with the food or container.

Insulating means are provided for substantially preventing heat transfer from the heating element to the adjacent support portions. This results in functioning of the food as a heat sink whereby substantially all of the heat transferred from the heating elements is utilized for cooking or otherwise heating the food product. The inner walls of the supporting apparatus are designed for intimate contact with the food or its container whereby highly efficient heat transfer results can be achieved, and other features permit substantially the same efficiency without the high degree of intimate contact.

The structure of the invention is preferably characterized by a linkage for upper and lower housings which cooperates with the heating elements to provide the efficient operation described. Specifically, the linkage permits the use of food containers of different heights with the upper and lower housing being separated, depending upon the size of the food container. The linkage also preferably includes spring mechanisms which facilitate opening of the housings while at the same time operating to provide spring pressure for holding the housings in intimate contact with the food container during operation of the cooking apparatus.

Other features involve the use of "baking positions" which permit adjustment of the housings to locate the heating means close to, but not in pressure contact with the food. In all structures, novel heating element designs and housing designs improve the operating efficiency.

Figure 1:
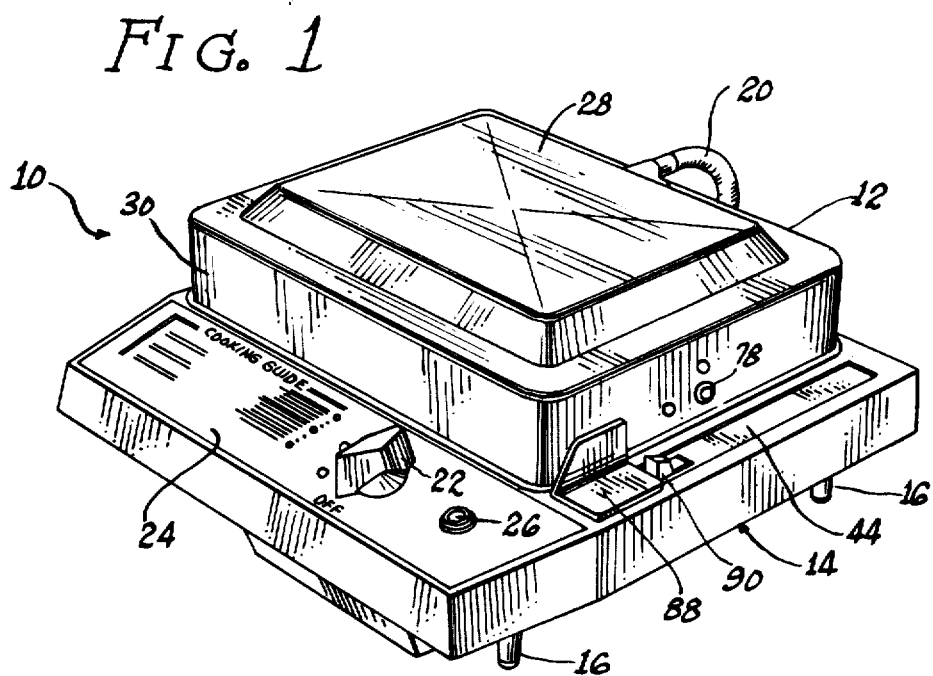
FIG. 1 is a perspective view of an apparatus characterized by the features of this invention.
Figure 2:
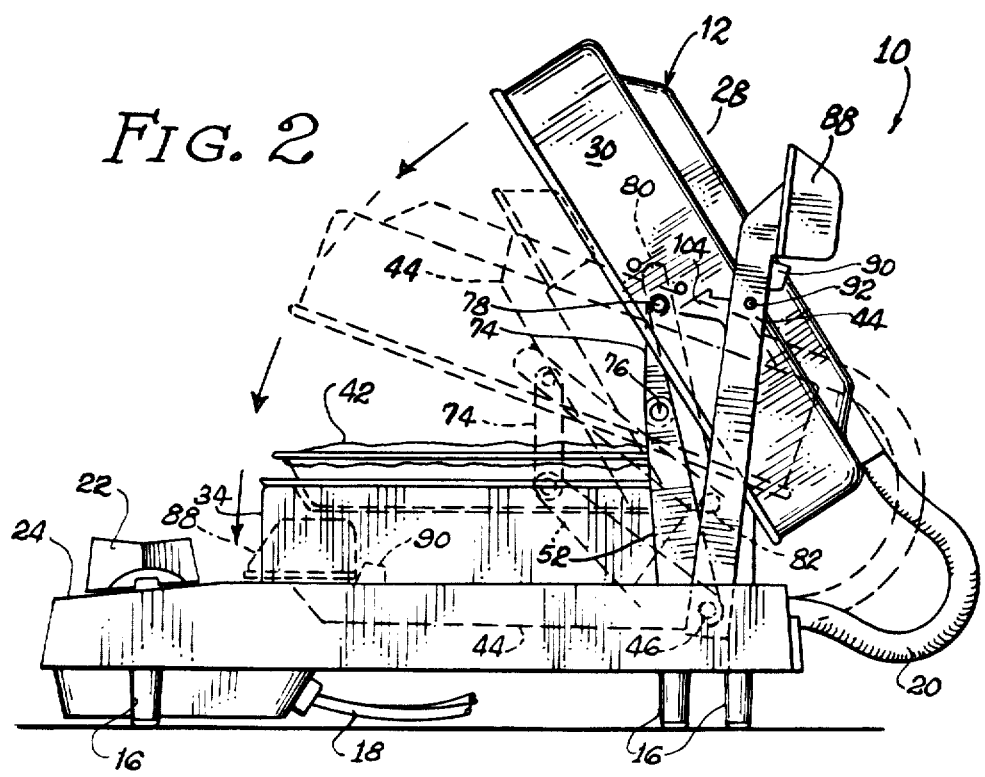
FIG. 2 is a side elevation of the apparatus with the upper housing portion in the open position.

FIGS. 1 and 2 illustrate an apparatus 10 characterized by the features of this invention. The apparatus comprises an upper housing 12 and a lower housing 14, the latter being provided with legs 16 whereby the structure is suitable for countertop use. A cord 18 is provided for connecting the apparatus to a suitable source of electricity. Flexible conduit 20 extends between the upper and lower housings so that electrical operation of heating elements in both these housings can be accomplished.

A timer switch 22 is positioned on a wall portion 24. This switch may be movable between various settings, and as shown in FIG. 1, a cooking guide can be displayed adjacent this switch. A light 26 is provided as a visual indication of the operating status of the apparatus.

As best illustrated in FIG. 3, the upper housing 12 defines a top wall 28 and downwardly extending side walls 30. An inner wall 32 is connected by means of rivets 33 and this inner wall defines a receiving compartment in conjunction with the side walls 30.

The lower housing 14 defines side wall 34, and an intermediate wall 36 comprises a continuation of this side wall. Inner wall 38 is secured in the lower housing by means of rivets 40. The wall 38 defines an interior depressed area which forms a receiving compartment for the lower housing.

A food container 42 is adapted to be positioned between the housings 12 and 14 for receipt within the compartments formed by these housings. The container will typically comprise an aluminum foil pan and a foil cover extending over the contents of the pan.

FIGS. 2 through 6 illustrate the linkage provided for the upper and lower housing. This linkage includes an arm 44 which is attached to rod 46. The connection of the arm to the rod is provided by means of a pin 48 which extends through an opening in the rod. The arm 44 comprises a hollow member including side walls 50 and a slot 50a is defined at the end of the arm for receiving one end of the pin 48. The other end of the pin extends within the arm and is received by slot 49 of transverse wall 51 whereby the pin is held against movement relative to the arm so that movement of the arm and rod 46 will occur simultaneously.

Lever arms 52 are also mounted on the rod 46, and the lever arms are provided with integrally formed feet 54. Pins 56 extend through the rods 46, and these pins engage the feet 54 whereby a driving connection between the pin and foot is achieved. The lever arms 52 are provided at both ends of the rod 46 whereby pins 56 provide a driving connection at each location.

The rod 46 carries a pair of springs 58 with one end 60 of each spring engaging a foot 54 on the side opposite the side engaged by pins 56. The opposite ends 62 of the springs 58 extend around pins 64 which are driven through the rod 46. This arrangement normally urges the lever arm 52 in a counterclockwise direction relative to the axis of rod 46.

A lighter spring 66 is also carried by the rod 46, and one end 68 of this spring extends around one pin 64. The other end 70 of the spring is positioned for engagement with shelf 72 which extends beneath the wall 24 of the lower housing. Due to the pressure of the end 70 against the shelf 72, the spring 66 operates to urge the rod 46 in a clockwise direction.

Figure 6:
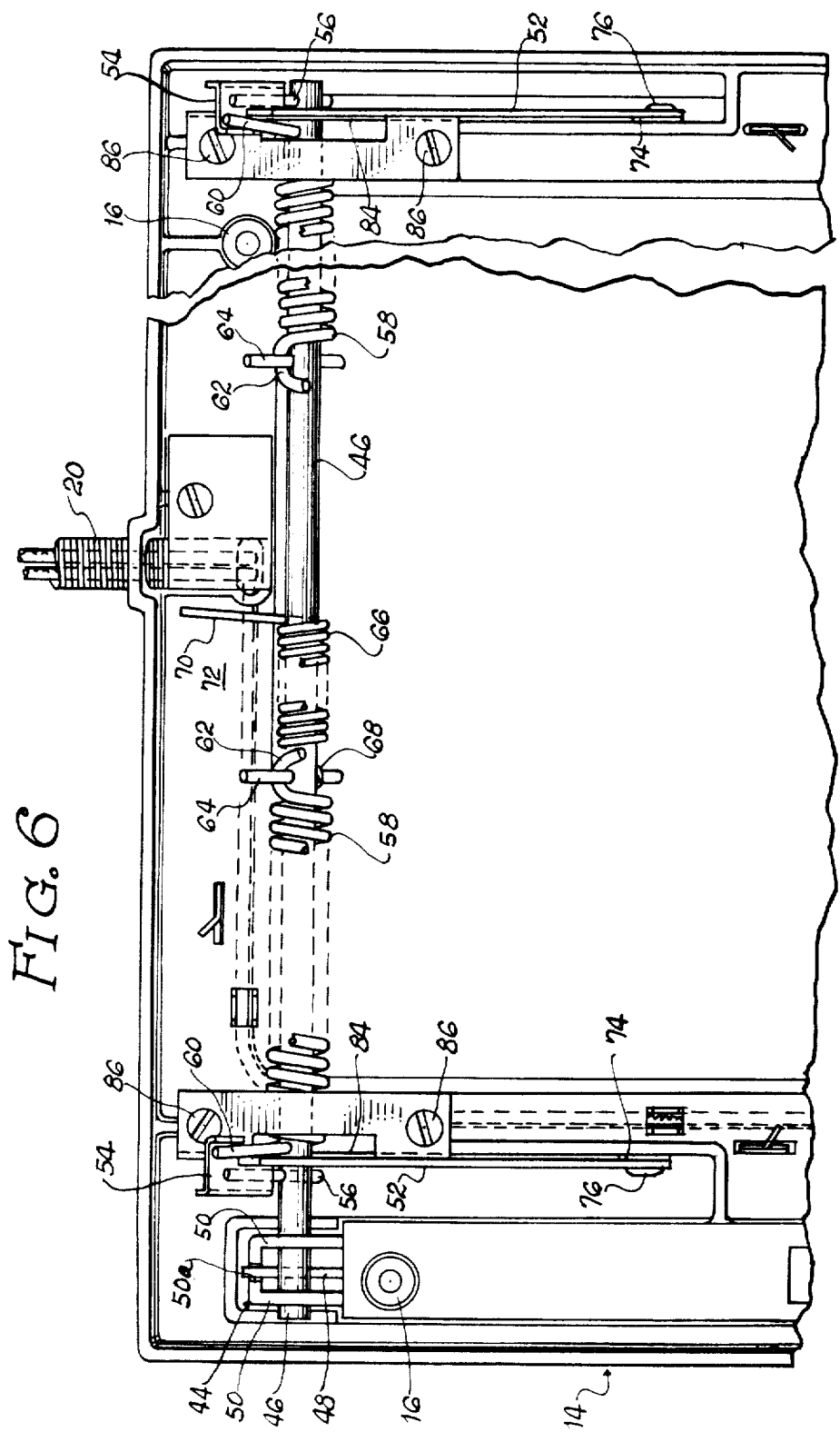
FIG. 6 is a fragmentary bottom plan view of the construction.

The end of each lever arm 52 carries a link 74 pivotally connected at 76. The opposite end of each link is pivotally connected at 78 to a second lever arm 80. The arms 80 are in turn pivotally connected at 82 to a pair of upstanding side plates 84. The plates 84 are secured to the underside of the lower housing by means of screws 86 as best shown in FIG. 6. Accordingly, the pivot points 82 are stationary during use of the apparatus.

The arm 44 is provided with a handle 88 which is accessible at the side of the upper housing 12. A button 90 is pivotally connected to the arm on pin 92, and an extension 94 of this button defines a protuberance 96. A spring 98 fits around this protuberance, and this spring is seated within a recess 100 defined by the arm. The spring 98 normally urges the button in a clockwise direction as shown in FIG. 5.

A transversely extending rib 102 is provided in the lower housing and the rib defines a slot 103 for receiving the shoulder defined by the lower end 104 of the button 90. Considering the position shown in FIG. 5, the button 90 can be manually moved in the counterclockwise direction to release the button from engagement with the rib 102. During movement of the upper housing into a closed position, the sloping surface of the end 104 will result in automatic snapping of the button into the latched position.

FIGS. 7 through 10 illustrate heating element assemblies utilized for achieving the novel results of the invention. The assemblies include a support plate structure 106 which carries the wire and other electrical components necessary for providing current to the resistance heating elements utilized. The plate defines a plurality of cut-out sections 108 which are bent downwardly. The support is formed of a resilient material, such as a suitable stainless steel sheet whereby the portions 108 serve as spring legs.

FIG. 8 illustrates insulating sheets made of mica or comparable material. These sheets include outer sheets 110 and 112 and an intermediate sheet 114. The intermediate sheet is provided with notches 116 whereby resistance wire 118 can be wrapped around the sheet in a suitable spaced-apart condition.

The sheets are assembled as a sandwich with the sheet 114 carrying the resistance wire being the intermediate sheet. As shown in FIG. 9, this assembly is mounted on the top surface of the sheet 106.

In the assembly of the apparatus of the invention, a sheet 106 with associated heating elements is positioned in each of the housings 12 and 14. As illustrated in FIG. 3, the housing 12 defines a hollow interior between the walls 28 and 32, and the heating element assembly is positioned in contact with the wall 32. The legs 108 of the support 106 press against the wall 28 whereby contact of the heating element assembly with the wall 32 is maintained. The spring legs 108 maintain this contact even when there is a tendency for the heating element assembly to warp whereby the efficiency of the heating operation is maintained even after the apparatus has been used for an extended period.

A support 106 carrying the heating elements is mounted within the lower housing 14 in the same fashion as described with respect to the upper housing. In this instance, the logs 108 press against the wall 36 whereby the heating element assembly is forced into contact with the wall 38.

In the use of the construction described, the unit is first opened by manual engagement of the button 90. When this latching engagement is removed, the arm 44 can be pivoted upwardly from the position shown in FIG. 5. It will be noted that the position of button 90 is convenient to the handle 88 to simplify this operation.

The handle 88 is utilized for lifting the upper housing as illustrated in FIG. 2. This lifting movement occurs without any significant resistance other than the weight of the structure, and, therefore, access to the interior of the apparatus is easily obtained. The container 42 can thus be seated in position within the well defined by the wall 38 of the lower housing 12. When in the fully raised position, the spring 66 serves as a counterweight to hold the upper housing against dropping, for example, if the apparatus is accidentally bumped.

The handle 88 is then utilized for moving the upper housing downwardly to the position shown in FIG. 3. Due to the presence of the container 42, the upper housing is held in spaced relationship relative to the lower housing, and at this point, the side walls 30 of the upper housing function to close off the space between the housing. The provision of these downwardly extending side walls thus serves to minimize heat loss during a cooking operation.

The wall 32 of the upper housing preferably defines bulbous areas 120 which are located in selected positions on the wall. These bulbous areas protrude downwardly so that engagement of the wall 32 is initially provided solely by these areas. When the container 42 comprises a frozen food, the heating of the container will soften the contents to the extent that the area will gradually penetrate beyond the original upper level of the container. After this penetration, the area of contact between the wall 32 and the food product gradually increases, and this has been found to materially improve the efficiency of the cooking operation.

The weight of the upper housing 12 will, of course, assist in achieving the penetration of the areas 120. It is desirable, however, from the standpoint of material cost and operating ease to minimize the weight of the structural elements employed. Accordingly, the apparatus includes springs 58 which operate during cooking to press the upper housing downwardly toward the lower housing. Thus, it will be noted that the ends 60 of these springs press against the respective feet 54 to urge the lever arm 52 in a counterclockwise direction as viewed in FIG. 3.

A spring load is developed in the springs 58 due to the fact that the shaft 46 is rotated relative to the lever arm 52 during lowering of the arm 44 into latched position. Thus, when locating the upper housing on the lower housing while a container is holding these housings in spaced-apart relationship, the arm 44 must move counterclockwise relative to the arm 52 which provides the desired spring load. It will be noted that the springs 58 do not provide any resistance during lifting of the upper housing as shown in FIG. 2 since the lever arm 52 and rod 46 are then free to pivot in unison.

The combination of elements described provides a highly efficient heating operation. By the use of very thin insulating sheets 110, 112 and 114, for example in the order of 0.015 thickness, substantially all of the heat generated in the resistance elements is available for use. The manner of mounting the heating elements operates to preserve substantially all of the heat for cooking purposes since the heating elements substantially are insulated from contact with surrounding supports which would tend to carry heat away from the cooking area. The support 106 is primarily in contact with air, and the thin legs 108 will not conduct away large amounts of heat. The legs 108, of course, serve the additional function of pressing the heating element assembly into contact with the walls 32 and 38 so that the heat is passed directly to these walls.

The structure described results in functioning of the food in container 42 as a heat sink which, of course, provides the desired fast or short cooking period. Thus, the apparatus of the invention directs the heat toward the product to be cooked while substantially eliminating loss of heat to areas where it would be detrimental. The apparatus does not create any problem with respect to heating the area in which it is used which is a well-known problem with conventional ovens. More importantly, the efficiency of the heating operation results in substantially decreased cooking times whereby the convenience of frozen dinners is significantly increased. Cooking times in the order of 4 minutes for frozen dinners having a recommended cooking time of 35 minutes are typical.

The design of the wall 38 with the protruding bulbs 120 coupled with the linkage mechanisms of the invention is of major importance. It has been found that the penetration of these areas into the food product substantially increased the cooking efficiency and the spring pressure which is available during this phase of the operation greatly contributes to this efficiency.

FIGS. 11 through 19 illustrate alternative structures which incorporate various features of the invention, and which serve to illustrate various alternatives which can be considered for use in conjunction with the mechanisms already described.

FIG. 11 illustrates a construction comprising a single housing 128 having a front door (not shown) for insertion of a food container 130. A movable support plate 132 serves to locate the container in the solid-line position shown whereby the container is engageable with spring loaded heating elements 134. These heating elements are independently secured within the housing whereby food containers having different height levels can be independently accommodated. As illustrated, the heating elements 134 are provided with brackets 136 engageable with transversely extending ledges 138 whereby the heating elements are normally retained in the dotted-line positions shown until forced upwardly in opposition to the compression springs 140.

FIG. 12 illustrates a structure including an upper housing 142 and a lower housing 144. In this instance, a stationary supporting table 146 for food container 148 is provided. The respective housings are hinged together, and heating elements 150 of the type described with reference to FIG. 11 are provided for accommodating different areas of the container. It will be appreciated that the tables 132 and 146 may also be provided with heating elements so that heat can be supplied from both top and bottom.

In the construction of FIG. 13, the lower housing 152 supports a dish structure 154 supplied with suitable heating elements and dimensioned to receive food container 156. Insulation 158 such as glass wool fills the area between the heating elements and the housing wall, and it will be appreciated that such insulation could be incorporated with the other structures described.

The upper housing 160 of the structure of FIG. 13 carries a flexible blanket 162 having heating elements disposed therein. A plurality of springs 164 contact this blanket, and this provides an arrangement whereby food containers having irregular contours can be efficiently heated.

The structure of FIG. 14 comprises an upper housing 166 and a lower housing 168. The heating element 170 provided for the lower housing may be a stiff or flexible blanket for receiving container 172. A similar blanket 174 is carried by the upper housing. In this instance, however, conduits 176 and 178 communicate with the interior of the construction, and these conduits are connected to a vacuum source. When air is pumped out of the area supporting the container, the blankets will be in intimate contact with the container thereby providing heating efficiency. Essentially the same result can be achieved with this structure by applying gas or liquid pressure through ports 175. In either case, the arrangement of FIG. 14 provides side wall engagement which is also contemplated for other embodiments, for example, by providing spring loaded side walls.

Figure 15:
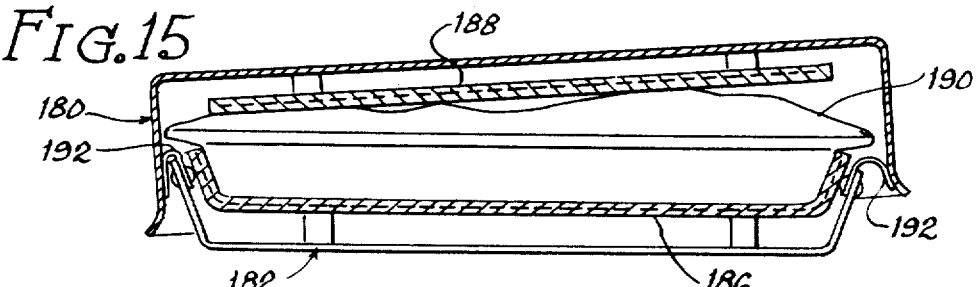

FIG. 15 illustrates an additional embodiment wherein the upper housing 180 is attached to lower housing 182 by means of an arm or hinge arrangement such as previously described. The lower heating elements are incorporated at 186, and the upper heating elements 188 are brought into contact with the food container 190. Preferably spring means are employed as previously described which act upon the housings to urge the housings toward each other. Flexible seals 192 are provided around the periphery of the construction to provide a suitable seal. In this arrangement, the mounting for the heating elements 188 is preferably flexible in nature to accommodate thickness variations in the food product.

Figure 16:
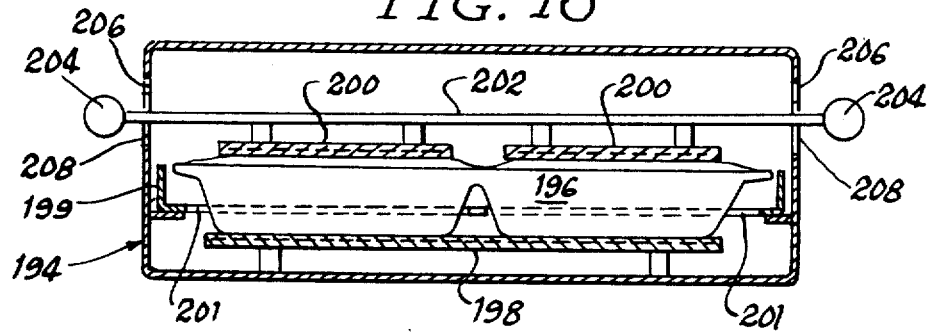

FIG. 16 illustrates a housing 194 having a front door (not shown) through which food container 196 can be located on heated supporting table 198. A plate 199 is provided with openings 201 for properly orienting the food tray, this plate being particularly useful where the food compartments of the container are of different sizes. The upper heating elements 200 are supported on a transversely extending rod 202 carrying handles 204 which extend outwardly of the housing. Horizontally extending slots 206 communicate with vertical slots 208 whereby the elements 200 could be maintained in a raised position during insertion and removal of the food product. The heating elements 200 are conveniently designed with a configuration corresponding with the shape of the food containing compartments of the container 196. For example, if three triangular compartments are located in a container for receiving three food courses, the elements 200 can be shaped and positioned to conform with these pockets.

FIG. 17 illustrates an adaptation of the invention wherein the heated table 210 and the upper heating elements 212 are exposed rather than being confined within a housing. Since the food container 214 is the only structure of consequence in direct contact with the heating elements, the food in the container will still act as the primary heat sink thereby accomplishing an objective of the invention.

FIGS. 18 and 19 illustrate an arm structure 216 in association with the upper housing 218 of a heating or cooking apparatus. This arm structure includes a handle 220 supported on transverse section 222 adapted to be held in a lower position by means of latch 224. The structure includes a pair of separate spring elements 226 each having one end pivotally connected at 228 to a side wall of housing 218. The opposite ends of these springs 226 are connected at the ends 230 of the arm 216, and these ends are pivotally connected at 232 to support base 234.

Downward movement of the handle 220 brings the arm and associated housing 218 downwardly toward the base 234. If a food container is located beneath the housing 218, and if the arm 216 latched, the spring means 226 will force the housing 218 downwardly relative to the food container. By providing appropriate heating elements within the food container, the spring structure described will provide the desired pressure engagement during a heating or cooking operation.

FIGS. 20 to 23 illustrate a further modification of the invention wherein the housing portions are provided with removable heat transmitting structures. In FIGS. 20 and 21, the upper housing 236 includes an inner wall 238 having heating elements associated therewith in accordance with the foregoing disclosure. On the inner side of the wall 238, there is provided a removable plate 240 defining a plurality of solid, heat conducting, protruding members 242. The plate 240 defines slots 244 on each side, and these slots are adapted to receive pins 246 so that the plate can be removably located on the wall 238. With this arrangement, a plate 240 can be designed to accommodate a container of a particular shape. For example, a protrusion 242 may be formed in the plate opposite each separate food compartment of a container.

In FIG. 22, a plate 248 is provided with three solid, heat conducting, generally triangularly shaped protruding sections. These sections are dimensioned in accordance with the shape of food compartments of a typical frozen food container. Arms 250 are provided for the plate 248 to permit removable attachment of the plate.

FIG. 23 illustrates a structure 252 having arms 254 for attachment of the structure to the lower housing. This structure defines solid, heat conducting ribs which are dimensioned to be received within grooves formed in the bottom wall of a typical frozen food container. These ribs function in the manner of the protruding portions previously described so that heat from the heating elements can be rapidly transferred to the food container. If desired, a structure as shown in FIG. 22 could be associated with one housing and the structure of FIG. 23 with the other.

FIGS. 24 through 27 illustrate the construction of the invention in a modified form to include position control means whereby the upper housing 12 can be maintained in a desired space relationship relative to the lower housing 14. Thus, the arrangements illustrated are designed to provide versatility in the construction in the sense that the heated inside wall of the upper housing will not come into contact with the food product. This arrangement would be desirable whenever the heating function of the structure is desired for cooking or heating food with an exposed top as opposed to food which is covered with foil or a like material. In the case of pizza, for example, it is preferable to avoid direct contact with the sticky top of the food.

In FIGS. 25 and 26, an arrangement is employed for holding the arm 44 in a raised position. Specifically, control member 46 is pivotally mounted on pin 48, and the end of the control member is received within the recessed interior 260 of the arm 44. The pin 48 extends between channel walls 262 and 264 defined by the lower housing. A knob 266 is exposed on the exterior of the channel housing, and this knob serves to position the control member 46 in one of the dotted line or solid line positions of FIG. 25. It will be appreciated that when the control member is in the solid line position, the arm 44 cannot be brought downwardly into a position which will bring the upper housing into contact with a food product supported by the lower housing. The side walls 30 of the upper housing still extend downwardly far enough to enclose the space between the housings whereby the food product can be efficiently heated.

FIGS. 27 and 28 illustrate an alternative arrangement. In this instance, a control member 268 is attached within the confines of the arm 44. This control member defines steps 270 and 272 as well as a bottom end 274. A slide 276 is mounted between the channel walls 278 and 280. An actuating button 282 is formed on the slide so that the slide can be moved between the positions shown in FIG. 27. The inturned portion 284 of the slide is received within a slot 286 defined by the channel wall 278, and this slot serves to limit the possible extent of movement of the slide. Appropriate markings may be formed on the lower housing adjacent wall 280 to indicate the position of button 282 which will achieve the fully raised, intermediate, and lower positions.

The end 274 and the steps 270 and 272 are adapted to engage the slide 276. It will be appreciated that this will serve to hold the arm 44 in any of three positions above the lowermost position possible. This arrangement, therefore, provides an adjustable control permitting the upper housings to be brought close to but not directly into contact with a food product resting on the lower housing. When the slide is at the extreme left-hand position, the arm 44 can be moved all the way down for purposes of applying pressure to the food product in the manner previously explained.

FIG. 29 illustrates an alternative arrangement for supporting a flexible conduit 288 between the upper and lower housings. It will be noted that in this instance, the conduit is received within a channel 290 which may be formed integrally with the upper housing or provided by means of a bracket attached to the housing. The conduit extends substantially parallel with the back walls of the respective housings and is then received within a compartment 292 defined by the lower housing. With this arrangement, the conduit 288 permits the desired relative movement of the upper and lower housings without unnecessarily taking up space.

The conduit 288 also acts as a spring mechanism which normally urges the upper housing 12 in a counterclockwise direction relative to the lower housing 14. A bracket 294 which is attached to the inner wall of the upper housing serves as a pivotal connection for the arm 80 by means of pin 78 which is attached to the bracket. The bracket is stepped inwardly whereby a horizontal portion 296 is adapted to be engaged by the end 298 of the arm.

When it is desired to locate the upper and lower housings in a "baking position", that is, with the upper housing held away from the lower housing, the pivoting action imparted by the conduit 288 will drive the surface 296 into engagement with the end 298. Because of the linkage arrangement illustrated, this will automatically place the upper housing in a horizontal position when the upper housing is in the "baking position". When the upper housing is moved further downwardly for purposes of achieving contact with a food product, it is free to adjust to the food contour. Thus, the arrangement does not in any way interfere with the operation previously described.

Where reference is made to "horizontal", it will be understood that this assumes that the lower platen is horizontally disposed. In some instances, the structure may be tilted, e.g., to provide for automatic runoff of liquid, in which event the structure of FIGS. 29-33 will hold the upper housing platen in parallel but at the same angle to the horizontal as the lower housing platen.

When the upper housing is to be fully opened for access to the interior of the construction, the end 298 of arm 80 pushes against the bracket 294 forcing the upper housing to tilt backward with the arm 80 as this arm pivots at 82. A wide open position is insured for the best access to the interior of the construction.

FIGS. 31-33 illustrate a further alternative of the invention. In this arrangement, a bracket 300 is attached by means of rivets 302 to the side wall of upper housing 12. This bracket carries the pin 78' which provides support for arm 80' and link 74'. In this arrangement, the link 74' is provided with an inturned end 304. The bracket 300 defines an inturned ear 306, and a hairpin spring 308 defines ends which straddle the end 304 and ear 306. It will be appreciated that the action of the spring 308 normally holds the end and ear in vertical alignment. This has the effect of maintaining the upper housing 12 in a horizontal position since the upper housing can only rotate relative to the pin 78' upon the application of a force stronger than the spring 308. This force may cause a temporary movement from the horizontal; however, the horizontal position will then be restored by the spring action.

In the embodiment of FIGS. 34 and 35, a bracket 310 is located on the upper housing 12. The end 298 of arm 80 is adapted to engage the surface 312 of the bracket in a fashion similar to that described with reference to FIGS. 29 and 30. With the action of a conduit such as the conduit 288, horizontal positioning of the upper housing is achieved.

In the arrangement of FIGS. 34 and 35, a knob 314 is accessible at the side of the lower housing 14, and a rod 316 is adapted to be shifted horizontally upon pulling or pushing of the knob. A pivoting lever 318 is attached to the rod 316, and a horizontal shaft 320 is connected to the lower housing to provide a pivot for the lever. The lever preferably comprises a section 322 which connects the lever 318 to a corresponding member 324. Each of the members 318 and 324 defines an ear 326 with the ears being adapted to be received in openings 328 defined adjacent the top of the lower housing.

When it is desired to retain the upper housing in a spaced position relative to the lower housing, the knob 314 is pushed inwardly to expose the ears 326. The rim of the upper housing then seats on these ears so that the desired spaced relationship can be obtained. Lowering of the upper housing can then be achieved by simply pulling outwardly on the knob to retract the ears.

FIGS. 36-39 illustrate a modified arrangement of the apparatus, this arrangement including an upper housing 412 and a lower housing 414. The lower housing comprises a supporting structure for the upper housing and includes a pivot rod 446 which supports a lever arm 452. This lever arm is connected by means of pin 478 to the upper housing. A link 474 extends from the pin 478 for attachment to lever arm 480. A second link 484 is connected to the arm 480 at 482, and this second link is also pivotally connected to the rod 446.

The link 474 defines an inturned end 404 and a bracket positioned behind the link defines an inturned end 406. This structure in combination with hairpin spring 408 provides an arrangement for holding the upper housing in a horizontal position as described with reference to FIGS. 31-33.

The lever arm 452 defines an ear 454 which includes an end tab 456 which is movable in a path to provide for engagement with link 484. The structure of FIG. 36 is provided with an arm (not shown) having essentially the same operating features as the arm 44. In addition, an arrangement such as shown in FIGS. 27 and 28 is preferably employed so that the structure can be utilized in a fully closed position as shown in FIG. 36 or in a plurality of raised positions as shown in FIG. 37.

When moving from the fully closed to the fully raised position of FIG. 37, the ear 454 moves adjacent the link 484. Further movement of the arm 452 drives the link in a clockwise direction as shown in FIG. 38 whereby the upper housing is raised to a loading position.

Continued movement of the arm 452 operates to drive the housing into the relationship shown in FIG. 39. It will be apparent that each heated surface is now exposed so that the structure provides two separate heating plates which can be independently utilized. Feet 490 are preferably formed in the upper housing for use in this arrangement.

FIG. 40 illustrates a still further modification of the invention relating to means for controlling the spring action which is developed between the upper and lower housings. With reference, for example, to FIG. 6, it will be noted that springs 58 are engaged with pins 64, and it will be apparent that the tension in the springs will be varied as the rod 46 carrying the pins is rotated. In the arrangement of FIG. 40, an adjustment knob 500 is positioned (for example adjacent arm 44), and a worm 502 is attached on the knob shaft 504. Worm gear 506 is tied to the rod 46 and rotation of the knob 500 will, therefore, permit changes in tension of the springs 58. Since the worm and gear arrangement is self-locking, these changes can be very readily achieved, and the user of the construction can, therefore, select a spring pressure which is most suitable.

FIGS. 41 and 42 describe an arrangement for mounting the heating platens for cleaning and maintenance purposes. In these views, reference is made to a platen 38 associated with the lower housing 14; however, it will be understood that a similar arrangement is achievable with respect to the upper housing.

A stop plate 550 is positioned beneath the platen 38, and the heating element sheets 110, 112 and 114 are positioned beneath the plate. The sheet 106 and springs 108 serve to press the plate 550 into engagement with platen 38. Quick disconnect fasteners 552 are provided for securing the platen 38 to the lower housing. These fasteners extend through slots 553 defined by the lower housing and are held in position by means of pins 555. When turned 90°, the fasteners and associated platen are released as shown in FIG. 42.

When the platen is released, the spring action will operate to force the platen upwardly so that it can be readily grasped and easily cleaned. The stop plate 550 defines ears 554 at a plurality of locations, and slots 556 are defined by the housing wall to receive these ears. When the fasteners 552 are turned to an unlocked position, the ears move upwardly as shown in FIG. 42 so that the stop plate is restrained against movement thereby maintaining the heating elements in position. When the platen 38 has been cleaned, it can be simply reinserted and the apparatus is ready for additional use. Since the platen should be the only portion of the apparatus which requires significant cleaning, a highly practical way of maintaining the construction in a sanitary condition is provided without in any way endangering the other elements due to submersion thereof.

FIGS. 43–45 illustrate a modified form for a heating platen and associated heating elements. The figures relate to an upper housing 612; however, a similar arrangement is suitable for a lower housing.

The construction includes a heating surface or platen 632 which is attachable by means of fasteners 633 to the upper housing wall, this wall including downwardly extending sides 630 and spaced apart horizontally extending top wall 628.

The heating elements comprise wires or other conventional conductors 640 which are formed in a pattern on the inner surface of the platen 632. These heating elements are covered with an insulating material and are enclosed in a metal sheath 642. The combination may be cast integrally with the platen 632 or the metal sheath may be braised or welded into position. Wire leads 644 and 646 are provided with the latter extending through a thermostat 648. The arrangement provides an extremely efficient means for achieving the results of the invention since the heat generated will pass to the surface of the platen 632, and virtually none of the heat will be dissipated in the opposite direction since this is essentially non-conducting air space. Any food in contact with or adjacent the platen will, therefore be rapidly heated with great efficiency in the operation.

An alternative design for a heating element construction is illustrated in FIG. 46. This arrangement is also described with reference to an upper platen 732; however, it will be understood that the features are equally suitable for use in connection with a lower platen.

A heating element combination similar to the type previously described including insulating sheets 710 and 712 and a sheet 714 with associated conductors is located adjacent the platen 732. A plate 706 is located over the sheets, and it will be noted that the sheets as well as plate 706 define openings shown generally at 708. The platen 732 has tabs 711 extending outwardly from the backside thereof, and these tabs are adapted to be received by the openings 708 during an assembly operation. When the tabs are bent-over in the manner shown, the heating elements are secured in place. If desired, the processing of the plate 706 may be such that the plate is normally bent into concave sections as shown in FIG. 46a. When the tabs 711 are bent downwardly, the plate will then automatically be pressed resiliently against the heating elements to insure close contact between the heating elements and the plates. This arrangement, therefore, permits the desired high efficiency heat transfer since there is virtually nothing behind the heating elements to conduct heat in a direction away from the platen.

FIG. 47 illustrates an alternative design for the heating elements. In this instance, one insulating sheet such as sheet 112 previously referred to is eliminated. A plate 806 is adapted to be placed in direct contact with one side of insulating sheet 814 which carries the conductive ribbon 808, this ribbon being exposed only on the other side of the sheet 814. This plate defines a cut-out section 810, and the notched edge 812 of sheet 814 provides for winding of a ribbon without shorting. This arrangement provides a less expensive heating element assembly since only one other insulating sheet (corresponding with sheet 110) is now provided when assembling the structure with a platen.

With respect to the disclosures of FIGS. 46 and 47, it will be understood that variations are possible, for example, the use of studs or rivets in place of tabs. The tab, stud, or rivet arrangement can also be utilized in association with the structure of FIG. 7 instead of utilizing spring legs such as shown at 108.

Instead of having conductors wound on a sheet 114 as is the case with ribbons 812 in FIG. 47, the conductors may comprise a ribbon or the like laid out in a pattern and laminated in place with a laminated coating insulating the side of the assembly carrying the pattern. An etched pattern is also possible using techniques employed in making printed circuit boards.

FIG. 48 illustrates modifications for a heating plate particularly with reference to the heating elements associated therewith. The plate 900 comprises a thin sheet of material which may be coated with a hard wear coating or a release type coating. The adjacent sheet 902 may be any suitable type of resistance heating element along the lines previously described or with other characteristics. This sheet is pressed against the sheet 900 by means of a sheet 904 which is provided with a plurality of spring fingers 906. The sheet 904 thus provides a unitary assembly with the spring fingers 906 formed therein and with the number of spring fingers insuring substantially uniform pressure of the sheet 902 against sheet 900. Any deviations due to heating of the sheets can be substantially accommodated since the thin sheet 904 can offer pressure in individual areas of distortion. Thus, uniform heating can be accomplished even though the thin character of the structure can lead to distortions. With reference to the structure of FIG. 48, it should be understood that the sheet 904 could be inverted so that the fingers press against the sheet 902 with the main body of the sheet resting on the opposite wall of the housing. It is also contemplated that an intermediate pressure plate could be interposed between the ends of the fingers and the sheet 902. In that respect, the pressure plate may be formed with bumps for engagement with the ends of the fingers to more readily distribute the force applied by the fingers.

FIGS. 49 and 50 illustrate an arrangement wherein the platen 910 is provided with resistance heating means 912. These heating means may be engaged with the ends of fingers 914 which are formed in channels 916. As noted in FIG. 50, a plurality of the channel members may be spaced across the width of the construction to provide the desired uniform pressure. As shown in dotted lines in FIG. 49, a pressure plate 918 could be utilized for engagement by the fingers. Channel members 920 positioned perpendicular to the channels 916 could also be utilized as pressure distributing means. In place of the channels 916 and fingers 914, the resistance heating means 912 could simply be engaged by a plurality of coil springs or similar spring members extending from the housing wall toward the heating means 912.

It will be appreciated that a variety of shapes of channels, pressure plates and springs could be utilized depending upon particular applications. Elastomeric buttons, strips or sheets could, for example, be used in place of springs. In this connection, it is to be understood that these features are applicable to all embodiments of the invention, and this applies to all other construction details. Thus the various features described herein should be considered for use in association with embodiments other than the embodiment where particularly shown.

In the construction of FIG. 51, a housing 930 defines side walls 932 which terminate in a bottom rim. A heating platen 934 is supported by a lower housing structure 936, and this platen includes electrical resistance heating means which may take any of the forms previously described. The housing 936 defines a rim 938 which serves as a means for suspending the housing in an opening 940 defined by a table structure 942. Any other suitable support including the use of feet as described with reference to previous embodiments may also be employed.

The top wall of the housing 930 comprises a horizontally extending wall portion 944 which is spaced away from heating platen 946 to provide the insulating features previously described. A supporting arm 948 is pivotally connected at 950 to a bracket 952 supported on the table 942. It will be apparent that the arm 948 may be utilized to raise the housing 930 to the upper dotted line position shown in which case the structure assumes a loading position. When the food to be heated is in place, the housing 930 is lowered, and at this time, the arm 948 can be utilized for positioning the platen 946 in any desired position relative to the food. Thus, this platen can be located closely adjacent food for purposes of achieving the most efficient transfer of heat, and this efficiency is accomplished even though various different types and sizes of food product may be involved.

In discussing the heating elements which are characterized by the features of this invention, reference has been made to the use of "thin" structures in view of the fundamental feature of minimizing the retention of heat by the heating elements and associated platens, and maximizing the transfer of heat to the food product. Although the thinnest practical structure is desirable in this respect, the "thinness" must be determined by the structural characteristics, particularly physical characteristics, particularly structural strength at temperature which is otherwise required. Specific heat capacity varies generally with density and, therefore, materials of very low density are desirable even though in such cases, a thicker material may be required, and it will be understood that references to "thin" materials should be considered to be the thinnest allowable material particularly in relation to the specific heat capacity thereof.

Referring to the drawings, some dimensions which have been determined to be suitable have been recorded as follows:

| FIG. No. | Reference Numeral | Thickness |
|---|---|---|
| 9 | 106, 110, 112, 114 | .010–.020 inches |
| 45 | 632 | .040–.060 inches |
| 46 | 706 | .005–.015 inches |
| 48 | 900, 902, 904 | .016–.060; .016–.060; .010–.020 inches, respectively |
| 49 | 918, 916 | .005–.010; .010–.020 inches, respectively |

With reference to FIG. 48, a hard wear or release coating in the order of 0.0005 to 0.003 inches may be applied to the platen 900.

The constructions described have been found to provide distinct advantages when compared with conventional cooking structures. The following time chart illustrates the advantages of the invention when compared with a conventional electric oven. It will be noted that in addition to the time saving, significant improvements in energy consumption are achieved, and the surrounding area is not made uncomfortably hot by the operation.

COOKING COMPARATIVE TIME CHART

| | TIME IN MINUTES | | ADVANTAGES | | |
|---|---|---|---|---|---|
| | CONV. OVEN Preheat Time Included | Structure of FIG. 1 Preheat Not Required | Cooking Time | Cooking Cost & Rm. Heat | Comments |
| Frozen Items & Entrees | | | | | |
| Up to 7" × 9" Size | 30–45 | 6–12 | ↓ | 1/10 | Better Heat |
| Steaks & Chops | 15–30 | 5–10 | ↓ | 1/6 | Improved Flavor |
| Pizza Pie | 20–30 | 8–10 | ↓ | ↓ | |
| Waffles | 2.5–15 | 2–3 | ↓ | ↓ | |
| French Fried Potatoes | 20–25 | 8–9 | ↓ | 1/6 | |
| Baked Potatoes Stuffed | 45–55 | 10–18 | ↓ | 1/10 | Improved Taste |
| Meat Pie | 50–70 | 20–30 | ↓ | ↓ | |
| Fruit Pies | 55–75 | 30–40 | ↓ | ↓ | |
| Refrigerated Items | | | | | |
| Toast | 1.5–2.5 | 1.5–2.5 | Same | ↓ | More Uniform |
| Biscuits | 15–25 | 5–10 | ↓ | 1/5 | |
| Grilled Cheese Sandwich | 5–12 | 1.5–2.5 | 1/5 | 1/10 | Improved Taste |
| Beefburger | 13–25 | 3–4 | 1/5 | 1/10 | Better Flavor |
| Cheeseburger | 16–30 | 5–6 | 1/5 | 1/10 | Better Taste |
| Hot Dogs & Buns | | 2–3 | | | |
| Bacon | 9–15 | 3–8 | ↓ | ↓ | |
| Baked Apple Halves | | 10–15 | | | |
| Steaks & Chops | 15–30 | 4–8 | ↓ | 1/10 | Improved Flavor Uniformity |

Various additional features can be incorporated in the construction to facilitate the cooking operation. For example, temperature sensing means such as probes attached to the wall 32 can be employed. The probes may penetrate the cover of the container 42 for detecting the temperature at the interior of the food product. A shut-off mechanism for the unit can be controlled by an adjustable dial so that the heating will terminate when a desired temperature is sensed by the probes.

Alternatively, a timer could be utilized so that the cooking will cease after the elapse of a pre-set time. The setting mechanism may include a setting applicable to a frozen container with a different setting being provided for a room temperature container so that a shorter heating time will be involved.

At the conclusion of a heating cycle as determined by temperature probes, a timer, or by other means, mechanisms may be employed for automatically separating the housings so that additional cooking will not take place. Otherwise, a visual or audible signal could be utilized to indicate the end of the cycle. In order to further control the cooking operation, thermostat mechanisms may be associated with the heating elements to maintain the elements at or below a maximum temperature throughout the heating cycle.

The described construction is characterized by significant flexibility in that food held in containers of conventional sizes can be conveniently cooked; however, the structure is also very useful in connection with the cooking of food in other containers including food which is simply wrapped in aluminum foil by the user of the apparatus. The mounting for the upper housing provides for good contact with structures of irregular shape since the upper housing will adjust to different shapes. The mounting structure described provides this feature even where relatively stiff material is utilized for forming the contacting wall of the upper housing.

In the case of conventional "TV" dinner containers, close contact is also provided in the lower housing, particularly where a housing is provided with a wall such as the wall 38 which is dimensioned to receive the container. The side walls of the container are positioned closely adjacent side wall portions of the wall 38 providing more effective heat transfer. The downwardly extending walls 30 of the upper housing also provide improved efficiency since these walls serve as a barrier against the loss of heat.

It will be understood that various changes and modifications may be made in the structures described which provide the characteristics of this invention without departing from the spirit thereof, particularly as defined in the following claims.

That which is claimed is:

1. In a heating apparatus for food comprising a support for the food, an upper housing and a lower housing, said support being positioned within the confines of said housings, heating elements associated with at least one of said housings, means for separating the housings to provide access to the housings for placement of food on the support and for removal of the food, and means for bringing the housings together for confining the food within an enclosed space, said upper housing defining a horizontally disposed top wall and downwardly extending side walls, and said lower housing defining a horizontally extending bottom wall and downwardly extending side walls, the improvement wherein the downwardly extending side walls of said upper housing define a lower edge extending a substantial distance away from the upper housing top wall whereby the upper housing side walls telescope around the lower housing when the housings are brought together for heating food, the space between the housings being thereby substantially closed by said upper housing side walls during use of the apparatus, said lower edge being at all times maintained out of engagement with said lower housing, and means for variably controlling the distance between said top wall and said bottom wall when the housings are brought together to provide for adjustment of the size of said enclosed space, said side walls of the upper housing remaining in said telescoped position in all positions of adjustment whereby the space for the heating elements to heat can be minimized and the efficiency of heating thereby increased.

2. An apparatus in accordance with claim 1 wherein the heating elements are held in stationary position relative to an associated housing and wherein one housing is movable relative to the other housing to achieve the adjusting.

3. An apparatus in accordance with claim 1 wherein the heating elements are movably supported by the one housing, and including means for adjusting the position of the heating elements while the housings are held stationary.

4. An apparatus in accordance with claim 1 including means for normally maintaining said heating elements associated with the one housing in parallel relationship with the food supporting means of the other housing when the one housing is in cooking position relative to the other housing.

5. An apparatus in accordance with claim 1 including a heat conductive platen of low heat retaining capacity for supporting the heating elements, and means holding the heating elements intimately in associated with the platen.

6. In a cooking apparatus for food comprising a support for the food, an upper housing and a lower housing, said support being positioned within the confines of said housings, heating elements associated with at least one of said housings, means for separating the housings to provide access to the housings for placement of food on the support and for removal of the food, and means for bringing the housings together for confining the food within an enclosed space, said upper housing defining a horizontally disposed top wall and downwardly extending side walls, and said lower housing defining a horizontally extending bottom wall and vertically extending side walls, the improvement wherein the distance between the vertically extending walls of one housing exceeds the distance between the vertically extending walls of the other housing whereby the housings are adapted to telescope relative to one another when the housings are brought together, the space between the housings being thereby substantially closed during use of the apparatus, and means for variably controlling the distance between said top wall and said bottom wall when the housings are brought together to provide for adjustment of the size of said enclosed space whereby the space for the heating elements to heat can be minimized and the efficiency of heating thereby increased, at least one of said top and bottom walls comprising a thin-walled flexible member of low heat retaining capacity defining the cooking surface, said flexible member having its ends fixed relative to said housing, said heating means including a thin flexible heating means positioned against one side of the thin-walled flexible member, said thin-walled flexible member and said heating means comprising separate members subject to relative movement and thereby being subject to warpage relative to each other due to thermal stress, and mounting means comprising means for maintaining said heating means in position against said thin-walled flexible member to achieve continued intimate association thereof.

7. An apparatus in accordance with claim 6 wherein the downwardly extending side walls of said upper housing telescope around the walls of the lower housing.

8. An apparatus in accordance with claim 6 including means for restraining said upper housing from movement toward food supported in the lower housing to thereby maintain the inner wall of the upper housing out of contact with the food.

9. An apparatus in accordance with claim 8 including means for moving said restraining means into and out of a restraining position, and wherein the housing of at least one wall is spring loaded relative to the other housing for applying pressure to said food unless said restraining means is in the restraining position.

10. An apparatus in accordance with claim 8 including means for normally maintaining said upper housing in a parallel position relative to said lower housing.

11. An apparatus in accordance with claim 10 including control means for shifting said restraining means toward and away from a restraining position.

12. An apparatus in accordance with claim 6 wherein the housings are spring loaded relative to each other for applying pressure to food disposed therebetween.

13. An apparatus in accordance with claim 6 wherein the heating elements are held in stationary position relative to an associated housing and wherein one housing is movable relative to the other housing to achieve the adjusting.

14. An apparatus in accordance with claim 6 wherein the heating elements are movably supported by the one housing, and including means for adjusting the position of the heating elements while the housings are held stationary.

15. An apparatus in accordance with claim 6 wherein at least one housing is spring-loaded relative to the other housing so that the horizontally extending top and bottom walls apply pressure to said food.

16. An apparatus in accordance with claim 15 wherein means are provided for adjusting said pressure so that the pressure applied to the food may be greater or less than gravity pressure.

* * * * *